United States Patent
Leblanc et al.

(10) Patent No.: US 12,409,786 B2
(45) Date of Patent: Sep. 9, 2025

(54) MOUNTING CLAMP, ACCESSORY FOR VEHICLE HAVING MOUNTING CLAMP AND ACCESSORY KIT

(71) Applicant: SOUCY INTERNATIONAL INC., Drummondville (CA)

(72) Inventors: Etienne Leblanc, Becancour (CA); Normand Roy, St-Hugues (CA); Jonathan Frenette-Marcoux, Drummondville (CA); Michael Charrette, St-Felix de Kingsey (CA); Manuel Lemelin, St-Hyacinthe (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 297 days.

(21) Appl. No.: 18/120,233

(22) Filed: Mar. 10, 2023

(65) Prior Publication Data
US 2023/0286114 A1 Sep. 14, 2023

Related U.S. Application Data

(60) Provisional application No. 63/318,893, filed on Mar. 11, 2022.

(51) Int. Cl.
*F16B 2/18* (2006.01)
*B60R 7/08* (2006.01)
(Continued)

(52) U.S. Cl.
CPC .............. *B60R 7/08* (2013.01); *F16B 2/18* (2013.01); *B60R 11/00* (2013.01); *B60R 11/04* (2013.01); *B60R 11/06* (2013.01); *F16B 2/10* (2013.01)

(58) Field of Classification Search
CPC ...... B60R 2011/0059; F16B 2/10; F16B 2/18; F16B 2/185
(Continued)

(56) References Cited

U.S. PATENT DOCUMENTS

| 3,165,347 A | 1/1965 | Keskitalo |
| 3,165,348 A | 1/1965 | Keskitalo |

(Continued)

FOREIGN PATENT DOCUMENTS

| AU | 2010260146 A1 | 7/2014 |
| CN | 108025679 A | 5/2018 |

(Continued)

OTHER PUBLICATIONS

English abstract of NL1006117 retrieved from Espacenet on May 14, 2024.
(Continued)

*Primary Examiner* — Justin M Larson
(74) *Attorney, Agent, or Firm* — BCF LLP

(57) ABSTRACT

Mounting clamps for coupling an accessory to a structure are disclosed. The mounting clamp includes a body configured to engage the accessory and to receive a portion of the structure, a jaw and an actuator. The jaw has a first member pivotally to the body by a first pivot that is selectively moveable, and a second member pivotally connected to the first member by a second pivot. When the first pivot is in a first position, the mounting clamp is in a first configuration adapted for clamping to a first portion of a first structure. When the first pivot is in a second position, the mounting clamp is in a second configuration adapted for clamping to a second portion of a second structure. The jaw, which is selectively adjustable between open and closed positions, is configured to clamp one of the first and second portions when in the closed position.

19 Claims, 15 Drawing Sheets

(51) Int. Cl.
*B60R 11/00* (2006.01)
*B60R 11/04* (2006.01)
*B60R 11/06* (2006.01)
*F16B 2/10* (2006.01)

(58) Field of Classification Search
USPC .................. 224/558; 248/230.4, 231.51
See application file for complete search history.

(56) References Cited

U.S. PATENT DOCUMENTS

| | | | |
|---|---|---|---|
| 3,428,306 A | | 2/1969 | Harrison |
| 3,514,091 A | | 5/1970 | Johnson et al. |
| 4,213,589 A | | 7/1980 | Kirchgaesser et al. |
| 4,312,488 A | | 1/1982 | Pierron |
| 4,629,104 A | | 12/1986 | Jacquet |
| 4,860,980 A | | 8/1989 | Michot |
| 5,259,690 A | | 11/1993 | Legge |
| 5,419,479 A | | 5/1995 | Evels et al. |
| 7,819,448 B2* | | 10/2010 | Bates ................. B66C 1/48 294/104 |
| 8,021,169 B1 | | 9/2011 | Smith |
| 8,038,106 B2* | | 10/2011 | Magno, Jr. ............. H02G 3/32 248/65 |
| 8,085,481 B2 | | 12/2011 | Hill |
| 8,292,139 B2* | | 10/2012 | Golub .................. B62J 7/08 224/558 |
| 8,728,078 B2 | | 5/2014 | Miller |
| 9,545,835 B2 | | 1/2017 | Facchinello et al. |
| 10,166,849 B2* | | 1/2019 | Facchinello ......... B60J 7/106 |
| 10,436,232 B2* | | 10/2019 | Burnett .............. B25B 5/04 |
| 10,753,513 B2 | | 8/2020 | Jung |
| 2003/0080267 A1 | | 5/2003 | Eslick |
| 2004/0211801 A1 | | 10/2004 | Barbara |
| 2007/0012738 A1 | | 1/2007 | Grim |
| 2015/0108306 A1* | | 4/2015 | Chuang ................ F16M 11/14 248/231.51 |
| 2016/0296401 A1 | | 10/2016 | Cole et al. |
| 2021/0388864 A1 | | 12/2021 | Reymond |
| 2023/0286114 A1* | | 9/2023 | Leblanc ................ B60R 7/08 |
| 2023/0323711 A1* | | 10/2023 | Leblanc ................ F16B 1/00 292/217 |

FOREIGN PATENT DOCUMENTS

| | | |
|---|---|---|
| EP | 0656501 A2 | 6/1995 |
| FR | 2701070 A1 | 8/1994 |
| FR | 3062689 A1 | 8/2018 |
| GB | 1272342 A | 4/1972 |
| JP | H06207461 A | 7/1994 |
| NL | 1006117 C2 | 11/1998 |

OTHER PUBLICATIONS

English abstract of CN108025679 retrieved from Espacenet on May 14, 2024.

English abstract of FR2701070 retrieved from Espacenet on May 14, 2024.

English abstract of FR3062689 retrieved from Espacenet on May 14, 2024.

English abstract of JPH06207461 retrieved from Espacenet on May 14, 2024.

* cited by examiner

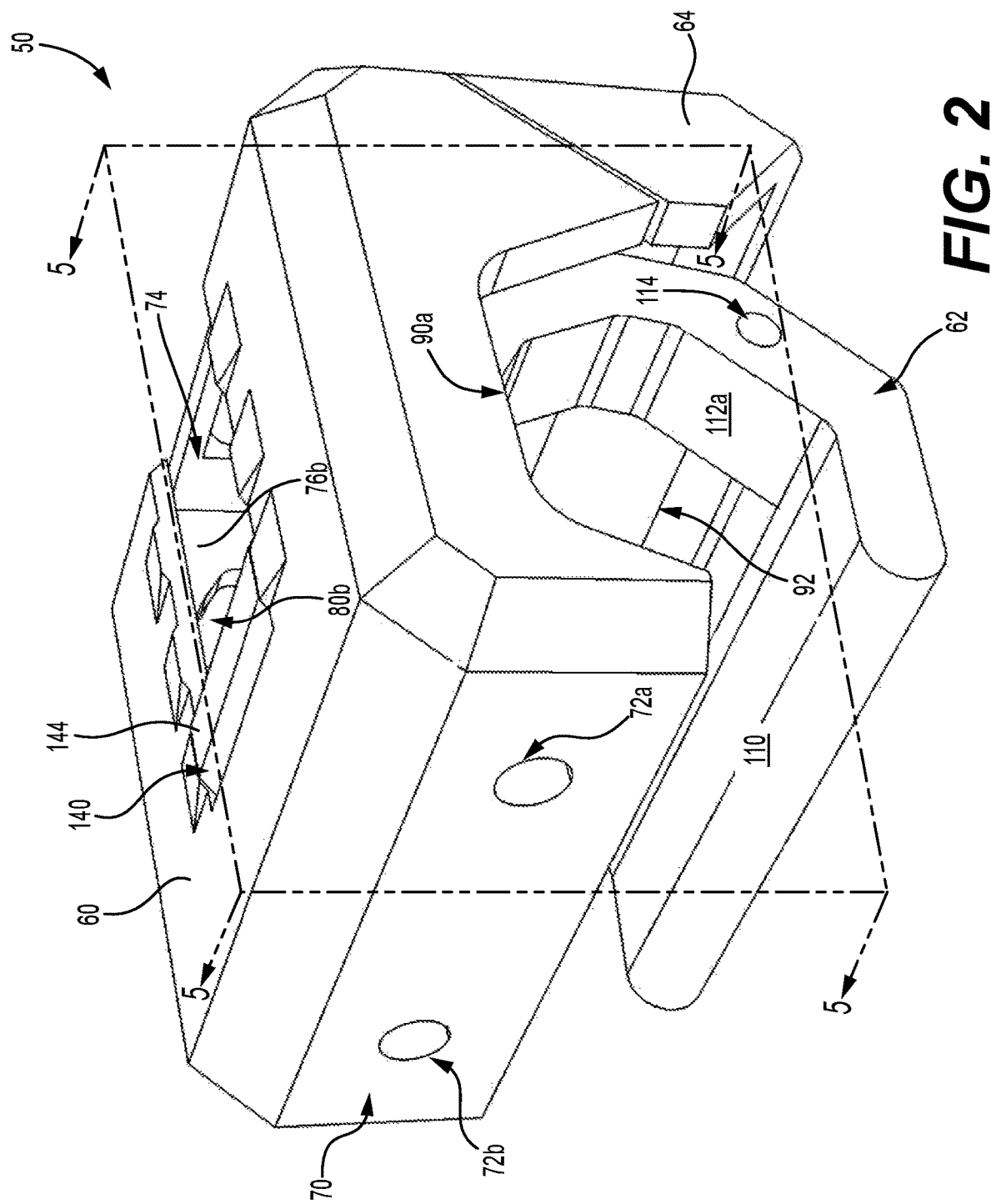

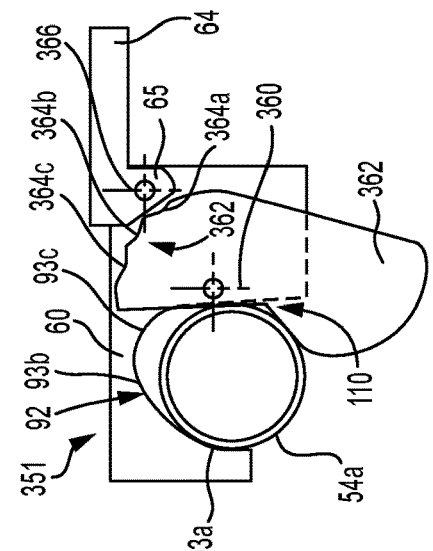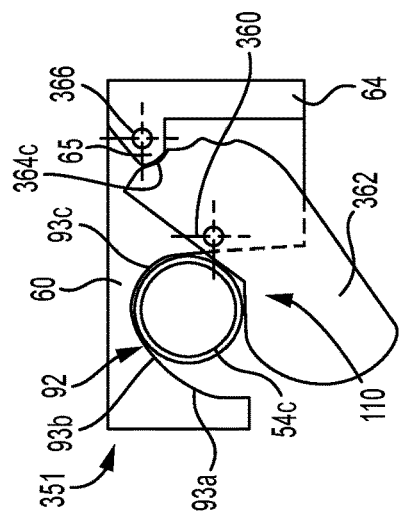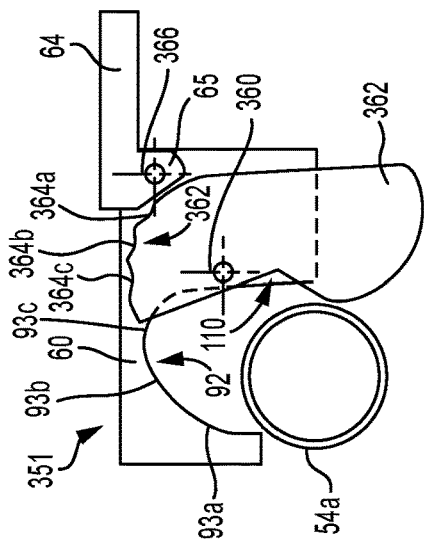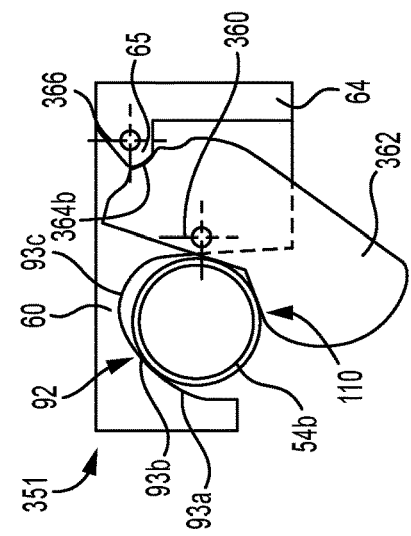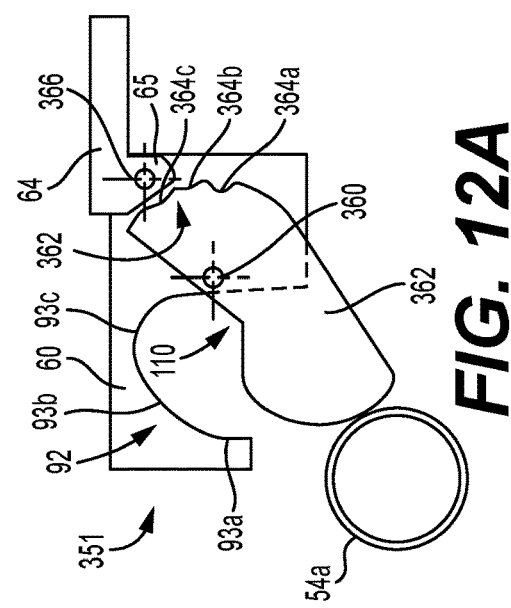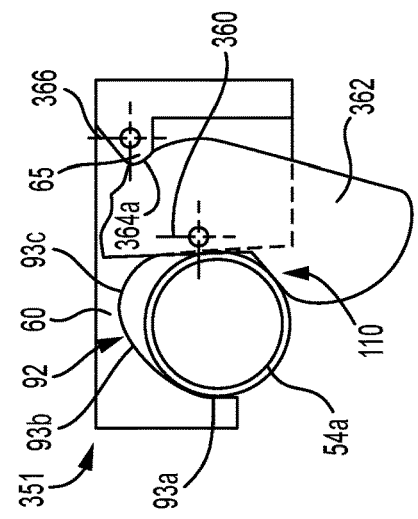

MOUNTING CLAMP, ACCESSORY FOR VEHICLE HAVING MOUNTING CLAMP AND ACCESSORY KIT

CROSS-REFERENCE TO RELATED APPLICATION

The present application claims priority to U.S. Provisional Patent Application No. 63/318,893, filed Mar. 3, 2022 entitled "Mounting Clamp, Accessory For Vehicle Having Mounting Clamp And Accessory Kit", which is incorporated by reference herein in its entirety.

TECHNICAL FIELD

The present technology relates to mounting clamps, accessories for vehicles having mounting clamps, and accessory kits.

BACKGROUND

Mounting clamps are used to couple one or more accessories to various structures. In some instances, mounting clamps can be connected to structures of vehicles for coupling accessories to vehicles.

Conventional mounting clamps are generally "size specific", (i.e., configured to connect to a structure having a given size). This can be problematic when there is a desire for using the mounting clamp on different structures having different sizes or on a given structure having members of different sizes, as more than one type of "size specific" mounting clamps may be required to attach to these structures.

Other mounting clamps that can connect to various sizes of structure members are known. However, the clamping force applied by these other mounting clamps can vary depending on the size of the structure upon which the mounting clamp is clamped or depending on the force that a user applies to the mounting clamp. In some instances, this can result in an accessory being mounted with a weak clamping force which can result in an unsafe attachment. In other instances, this can result in an accessory being mounted with an excessive clamping force which can damage the structure, the accessory and/or the mounting clamp.

Additionally, conventional mounting clamps can be time consuming to connect and disconnect to given structures, sometimes requiring tools for installing and/or removing fasteners. In addition, conventional mounting clamps that are adjustable to different sizes of structure members can typically require manual adjustments, sometimes with a tool, that are arbitrary (i.e., not pre-determined adjustment positions) and thus not necessarily resulting to an optimized and constant clamping condition for a given specific size of structure member.

Therefore, there is a desire for a device that can mitigate the above-mentioned issues.

SUMMARY

It is an object of the present technology to ameliorate at least some of the inconveniences present in the prior art.

According to one aspect of the present technology, there is provided a mounting clamp for coupling an accessory to a structure. The mounting clamp includes a body, a jaw and an actuator. The body has a mounting interface configured to engage the accessory. The body also has a coupling portion configured to selectively at least partially receive one of a first structure member and a second structure member, the first and second structure members having different sizes. The jaw is selectively adjustable between an open position and a closed position. The jaw includes a first member and a second member. The first member is pivotally connected to the body by a first pivot selectively movable between a first position and a second position. The second member is pivotally connected to the first member by a second pivot. The actuator is pivotally connected to the second member of the jaw by a third pivot, and is pivotally connected to the body by a fourth pivot. In response to the first pivot being moved to the first position, the mounting clamp is in a first configuration adapted for clamping to the first structure member. In response to the first pivot being moved to the second position, the mounting clamp is in a second configuration adapted for clamping to the second structure member. The jaw is configured to clamp one of the first portion of the first structure and the second portion of the second structure in response to being adjusted to the closed position.

In some embodiments, the first position is a first predetermined position and the second position is a second predetermined position.

In some embodiments, in response to actuating the actuator, the second pivot pivots about to the first pivot, and the jaw moves between the opened and closed positions.

In some embodiments, the second, third and fourth pivots are configured to provide an overcenter effect when the jaw is in the closed position.

In some embodiments, the actuator includes a lever.

In some embodiments, when the mounting clamp is in the first configuration and the jaw is in the closed position, the jaw is configured to clamp the first structure member with a first clamping force, and when the mounting clamp is in the second configuration, and the jaw is in the closed position, the jaw is configured to clamp the second structure member with a second clamping force. The first clamping force is generally similar to the second clamping force in terms of magnitude.

In some embodiments, when the first pivot is in one of the first and second positions, the first pivot is disposed on a border of a virtual circle, a virtual center of the virtual circle being generally aligned with the second pivot when the jaw is in the closed position.

In some embodiments, when the mounting clamp is in the first configuration and the jaw is in the closed position, the jaw is configured to clamp the first structure member with a first clamping force, and when the mounting clamp is in the second configuration, and the jaw is in the closed position, the jaw is configured to clamp the second structure member with a second clamping force. The first clamping force is generally similar to the second clamping force in terms of orientation.

In some embodiments, the first member has an angled portion, and a virtual bisector line passing through the angled portion is generally parallel to a virtual line passing through the first and second pivots.

In some embodiments, the angled portion is a v-shaped portion.

In some embodiments, the body has a guide configured to at least partially receive the first pivot, and to guide the first pivot between the first and second positions.

In some embodiments, the guide is a guiding slot.

In some embodiments, the guide is arcuate.

In some embodiments, the guide defines a first recess and a second recess spaced from the first recess, the first pivot is in the first position when the first pivot is in the first recess, and the first pivot is in the second position when the first pivot is in the second recess.

In some embodiments, the mounting clamp further includes a retaining member selectively moveable between a third position and a fourth position. The retaining member is configured to retain the first pivot in the first position when the retaining member is in the third position, and retain the first pivot in the second position when the retaining member is in the fourth position.

In some embodiments, the body defines a recess configured to at least partially receive the retaining member, the retaining member being moveable within the recess between the third and fourth positions.

In some embodiments, the mounting clamp, further includes a resilient member operatively connected to the body and to the first pivot, the resilient member biasing the first pivot toward one of the first and second positions.

In some embodiments, the mounting clamp further includes a resilient member operatively connected to the body and to the first pivot, the resilient member biasing the first pivot toward the first position. In response to one of the first and second structure members being at least partially received into the coupling portion, the mounting clamp being biased to move to a corresponding one of the first and second configurations. In response to the jaw being adjusted to the closed position, the jaw clamping the one of the first and second structure members.

In some embodiments, the mounting clamp is a self-adjusting clamp.

In some embodiments, the first structure member defines a first arc having a first arc radius, the second structure member defines a second arc having a second arc radius, and the first arc radius is greater than the second arc radius.

In some embodiments, one of the first and second radii is one of ⅜", ⁷⁄₁₆", ½", ⅝", ¹⁵⁄₁₆" and 1¼".

In some embodiments, the coupling portion defines a first arcuate section having a first arc radius complementary to the first arc radius, and a second arcuate section having a second arc radius complementary to the second arc radius.

In some embodiments, the first pivot is selectively movable between the first position, the second position and a fifth position.

In some embodiments, in response to the first pivot being moved to the fifth position, the mounting clamp is in a third configuration adapted for clamping to a third structure member, and the third structure member defines a third arc having a third arc radius, the third arc radius being different from the first and second arc radii.

In some embodiments, the fifth position is disposed on the virtual center.

In some embodiments, the accessory is one of: a bag, a case, a rack, a storage bin, a gas tank, a gun case, a toolbox, a camera, a chainsaw, and a shovel.

In some embodiments, the structure is on a vehicle.

In some embodiments, the vehicle is a powersports vehicle.

In another aspect of the present technology, there is provided an accessory for a vehicle having a mounting clamp according to the above aspect or according to the above aspect and one or more of the above embodiments.

In some embodiments, the accessory and the at least one mounting clamp are unitary.

In some embodiments, the accessory is one of: a bag, a case, a rack, a storage bin, a gas tank, a gun case, a toolbox, a camera, a chainsaw, and a shovel.

In some embodiments, the vehicle is a powersports vehicle.

In another aspect of the present technology, there is provided an accessory kit. The accessory kit includes an accessory for a vehicle, the accessory having a connecting portion.

The accessory kit also includes at least one mounting clamp according to the above aspect or according to the above aspect and one or more of the above embodiments. The mounting clamp is engageable to the connecting portion for coupling the accessory to a structure of a vehicle.

In some embodiments, the connecting portion of the accessory includes a first connecting portion and a second connecting portion, and the at least one mounting clamp is a first mounting clamp and a second mounting clamp, the first mounting clamp connectable to the first connecting portion and the second mounting clamp connectable to the second connecting portion.

In some embodiments, the vehicle is a powersports vehicle.

According to another aspect of the present technology, there is provided a mounting clamp for coupling an accessory to a structure. The mounting clamp includes a body, a jaw and an actuator. The body has a mounting interface configured to engage to the accessory, and a coupling portion configured to at least partially receive a first structure member and a second structure member having different sizes. The jaw is selectively adjustable between an open position and a closed position. The jaw is pivotally connected to the body by a first pivot, and is movable between a first position and a second position. The jaw has an engaging portion for positioning the jaw in the open and closed positions. The actuator is pivotally connected to the body by a second pivot and is engageable with the engaging portion of the jaw. In response to the jaw being moved to the first position, the mounting clamp is in a first configuration adapted for clamping to the first structure member. In response to the jaw being moved to the second position, the mounting clamp is in a second configuration adapted for clamping to the second structure member. The jaw is configured to clamp one of the first structure member and the second structure member in response to being adjusted to the closed position.

In some embodiments, the structure is on a vehicle.

In some embodiments, the vehicle is a powersports vehicle.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2 is a perspective view taken from a top, front, left side of the mounting clamp of FIG. 1A;

FIG. 12A is a schematic side elevation view of an alternative embodiment of a mounting clamp according to the present technology, with a connecting portion of a structure engaging a jaw;

FIG. 12B is a schematic side elevation view of the mounting clamp of FIG. 12A with the connecting portion moving the jaw;

FIG. 12C is a schematic side elevation view of the mounting clamp of FIG. 12A with the mounting clamp in a leading configuration;

FIG. 12D is a schematic side elevation view of the mounting clamp of FIG. 12A with the mounting clamp in a leading configuration, and the jaw being in a closed position;

FIG. 12E is a schematic side elevation view of the mounting clamp of FIG. 12A with the mounting clamp in an intermediate configuration, and the jaw being in a closed position; and FIG. 12F is a schematic side elevation view of the mounting clamp of FIG. 12A with the mounting clamp in a trailing configuration, and the jaw being in a closed position.

DESCRIPTION OF EMBODIMENTS

Figure 1A:
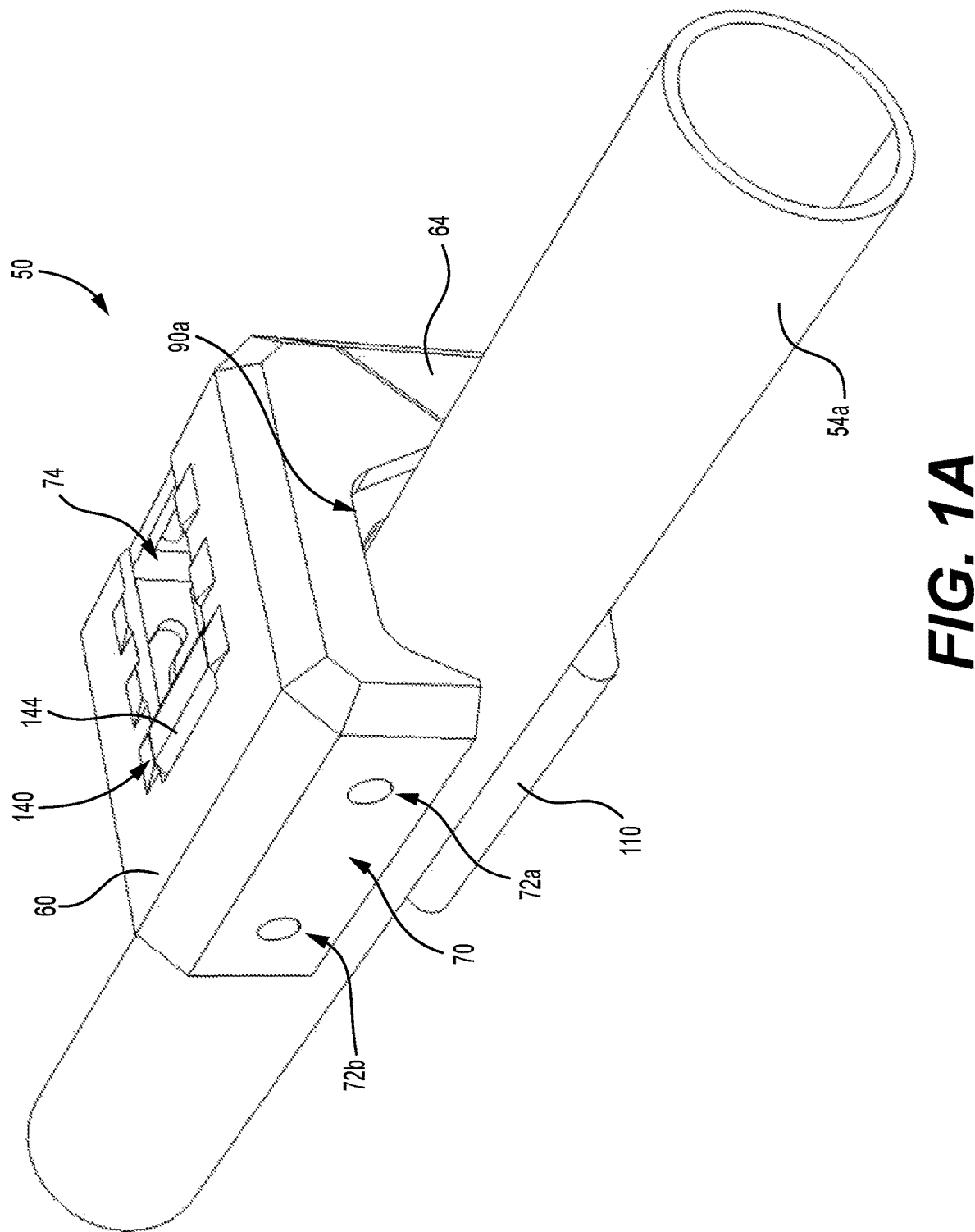
FIG. 1A is a perspective view taken from a top, front, left side of an embodiment of a mounting clamp in a leading configuration connected to a connecting portion of a first structure.
Figure 1B:
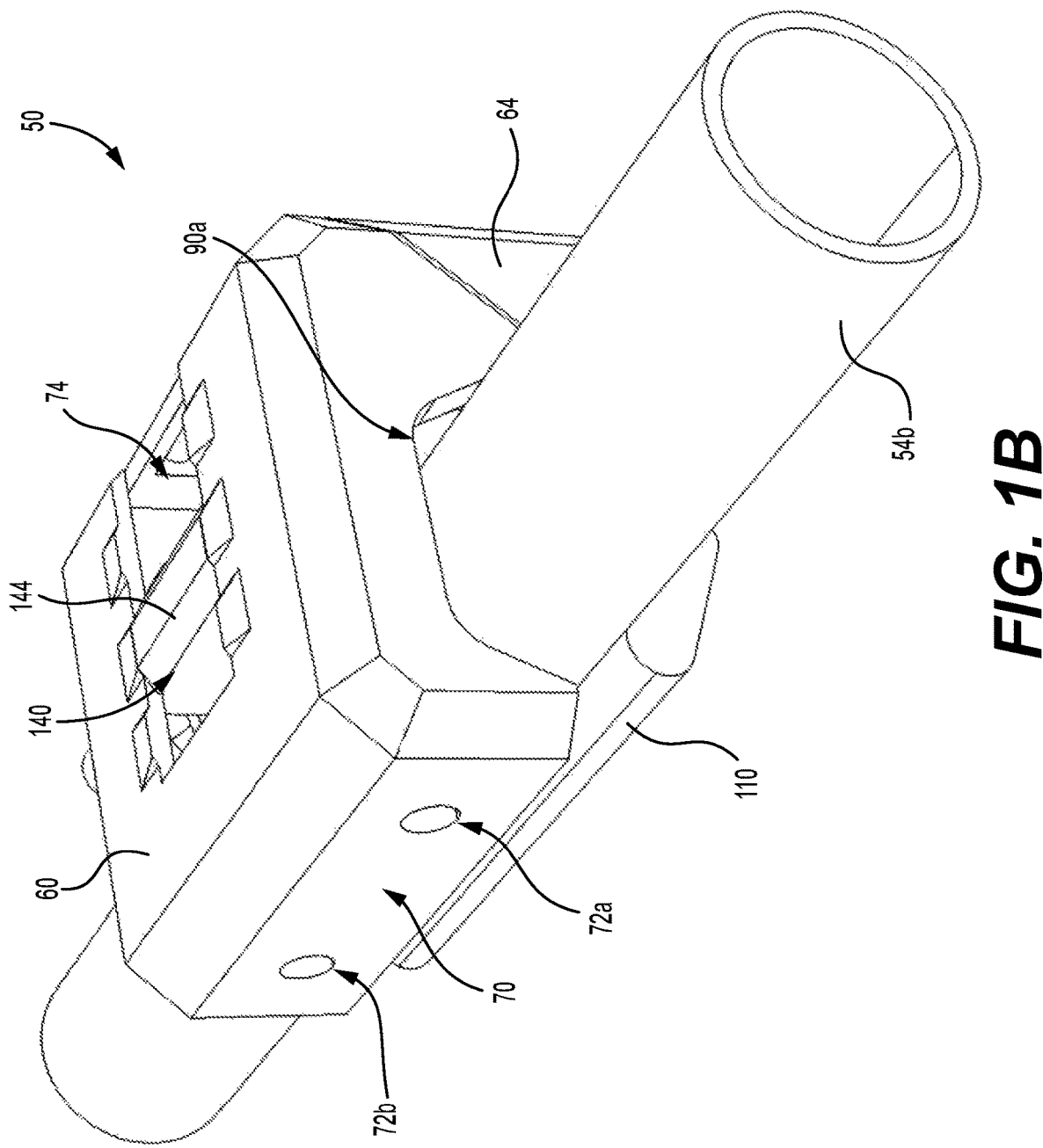
FIG. 1B is a perspective view taken from a top, front, left side of the mounting clamp of FIG. 1A in an intermediate configuration, connected to a connecting portion of a second structure.
Figure 1C:
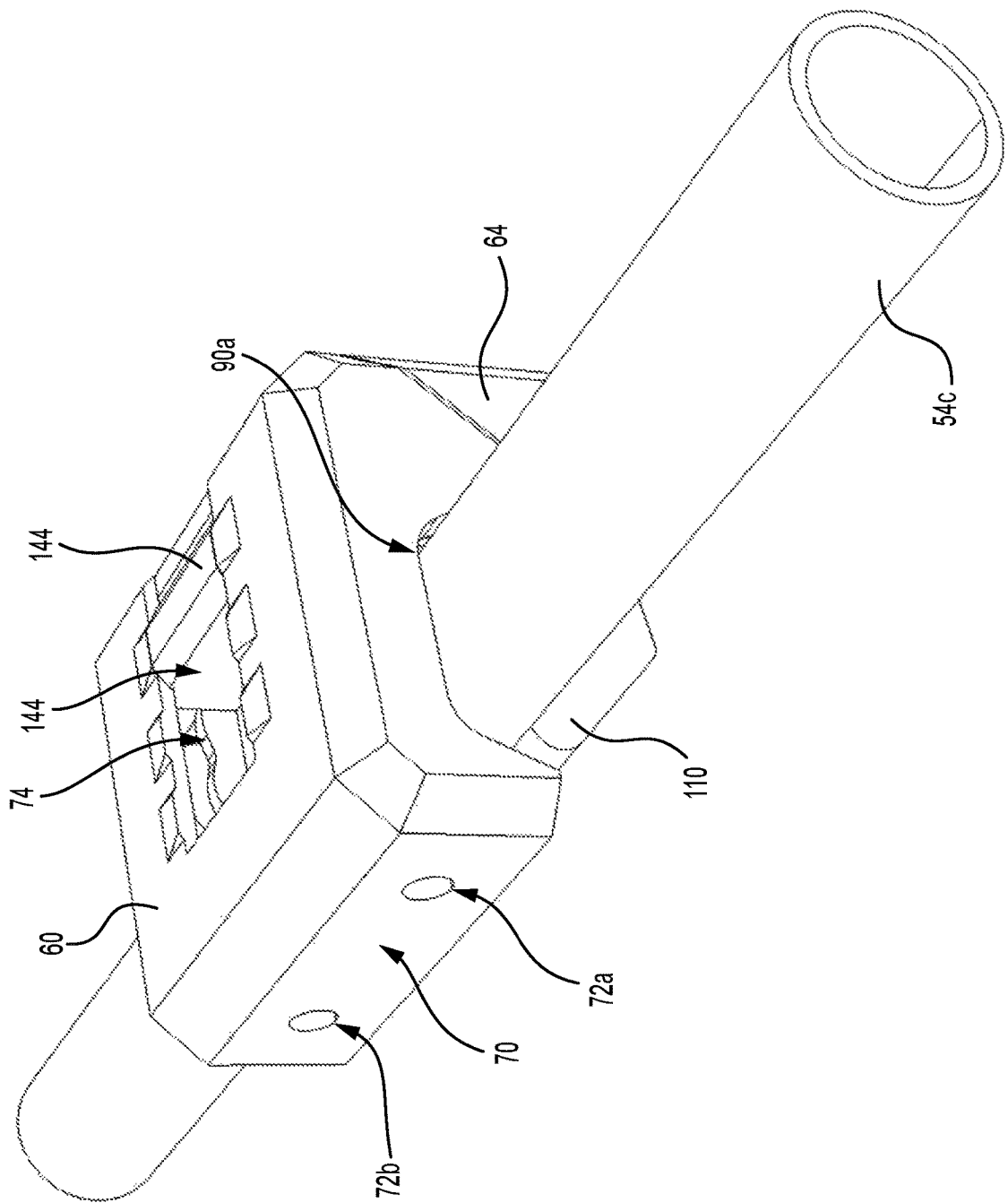
FIG. 1C is a perspective view taken from a top, front, left side of the mounting clamp of FIG. 1A in a trailing configuration, connected to a connecting portion of a third structure.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

In the context of the following description, "outwardly" or "outward" means away from a longitudinal center plane of the mounting clamp, and "inwardly" or "inward" means toward the longitudinal center plane. In addition, in the context of the following description, "longitudinally" means in a direction parallel to the longitudinal center plane of the mounting clamp in a plane parallel to flat level ground, "laterally" means in a direction perpendicular to the longitudinal center plane along a width of the mounting clamp, and "generally vertically" means in a direction contained in the longitudinal center plane along a height direction of the mounting clamp. Note that in the Figures, a "+" symbol is used to indicate an axis of rotation. In the context of the present technology, the term "axis" may be used to indicate an axis of rotation. Also, the term "pivot" includes all the necessary structure (bearing structures, pins, axles and other components) to permit a structure to pivot/rotate about an axis, as the case may be.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example, "A and/or B" is to be taken as specific disclosure of each of (i) A, (ii) B and (iii) A and B, just as if each is set out individually herein.

Broadly, the present technology relates to a mounting clamp configured to couple an accessory to a plurality of structures (one structure at a time) where each one of the plurality of structures has a connecting portion, and each of the connecting portion varying in size from one structure to another. In some embodiments, the mounting clamp could be configured to connect to various connecting portions of a same structure, where the connecting portions have different sizes. In one example, a vehicle, such as a powersports vehicle (e.g., all-terrain vehicle, utility-task vehicle, side-by-side vehicle, snowmobile) typically provides a structure configured to mount an accessory thereon.

In some cases, as mentioned hereabove, the structure can be part of the vehicle (i.e., vehicle is originally designed with the structure), but in other instances, the structure can be an add-on structure added to the vehicle afterward (i.e., vehicle is not originally designed with the structure). In some cases, the structure includes structure members or connecting portions of a specific size that is selected by the vehicle manufacturer or by the add-on structure manufacturer. In other words, the structures are typically size-specific. In addition, in some cases, there could be a plurality of structures provided on a given vehicle (e.g., a front structure and a rear structure, part of the vehicle or not, that each include structure members of different sizes of).

Broadly, a mounting clamp that is adjustable for clamping to different sizes of structure members is further described below. For example, the mounting clamp is configured to clamp to a plurality of connecting portions having pre-determined sizes or diameters without requiring any tool. In some embodiments, the pre-determined sizes or diameters correspond to diameters of typically used tubes in the automotive and/or powersports vehicle industries. More specifically, the mounting clamp can be manually adjusted by the user via pre-determined configurations that match with pre-determined sizes or diameters of the connecting portions to be clamped. In some embodiments, the mounting clamp can be automatically adjusted such that the mounting clamp automatically change its configuration ("self-adjusting") for matching with pre-determined sizes or diameters of connecting portions to be clamped. In either way, said mounting clamp is configured to apply a constant clamping force independently of the size or diameter of the connecting portion to which the mounting clamp is clamped, and is configured to, as will be described in greater detail below, provide generally optimal clamping condition.

Referring to FIGS. 1A, 1B, 1C and 2 to 5, a mounting clamp 50 according to an embodiment of the present technology is shown. The mounting clamp 50 includes a body 60, a jaw 62 and an actuator 64, all three of which are pivotally connected. The mounting clamp 50 is a quick-action mounting clamp.

As will be described in greater detail below, the mounting clamp 50 is configured to clamp to three structure members or connecting portions of different sizes, namely connecting portion 54a, connecting portion 54b and connecting portion 54c. The connecting portion 54a can be part of a first structure, the connecting portion 54b can be part of a second structure and the connecting portion 54c can be part of a third structure, where each of the first, second and third structures can be separate structures. In some embodiments, the first structure is a front structure provided on a front portion of the vehicle, the second structure is a rear structure provided on a rear portion of the vehicle, and the third structure is an intermediate structure provided on an intermediate portion of the vehicle between the front and rear portions thereof. In some embodiments, two or more of the connecting portions 54a, 54b, 54c could be part of one same structure. For example, in the connecting portion 54a could be a top portion of a front structure. It is contemplated that in other embodiments, the mounting clamp 50 could be configured to connect to two connecting portions of different sizes or four or more connecting portions of different sizes. While the connecting portions 54a, 54b, 54c are circular in the illustrated embodiment, it is contemplated that in other embodiments, the connecting portions 54a, 54b, 54c could be only partially circular with a section of the connecting portions 54a, 54b, 54c being arcuate. In some instances, the radius of the connecting portion 54a is greater than the radii of the connecting portions 54b, 54c, and the radius of the connecting portion 54b is greater than the radius of the connecting portion 54c. The connecting portion 54a has a radius of about ½", connecting portion 54b has a radius of about 7/16", and connecting portion 54c has a radius of about ⅜". It is contemplated that the connecting portions 54a, 54b, 54c could have different sizes in other embodiments. It will be understood that other radii are permitted without departing from the present technology.

The mounting clamp 50 is a quick-action mounting clamp that is adjustable in a plurality of configurations to set the jaw 62 in specific positions relative to the body 60, in accordance with a specific connecting portion (52a, 52b or 52c) to clamp on. As will be described in more details below, the body 60 provides a plurality of pivots, fixed or mobile relative to the body 60, that allow the relationship between the body 60, the jaw 62 and the actuator 64 to be selectively modified, while providing a constant clamping force and an optimal clamping condition, no matter in which configuration the mounting clamp is set.

Figure 5:
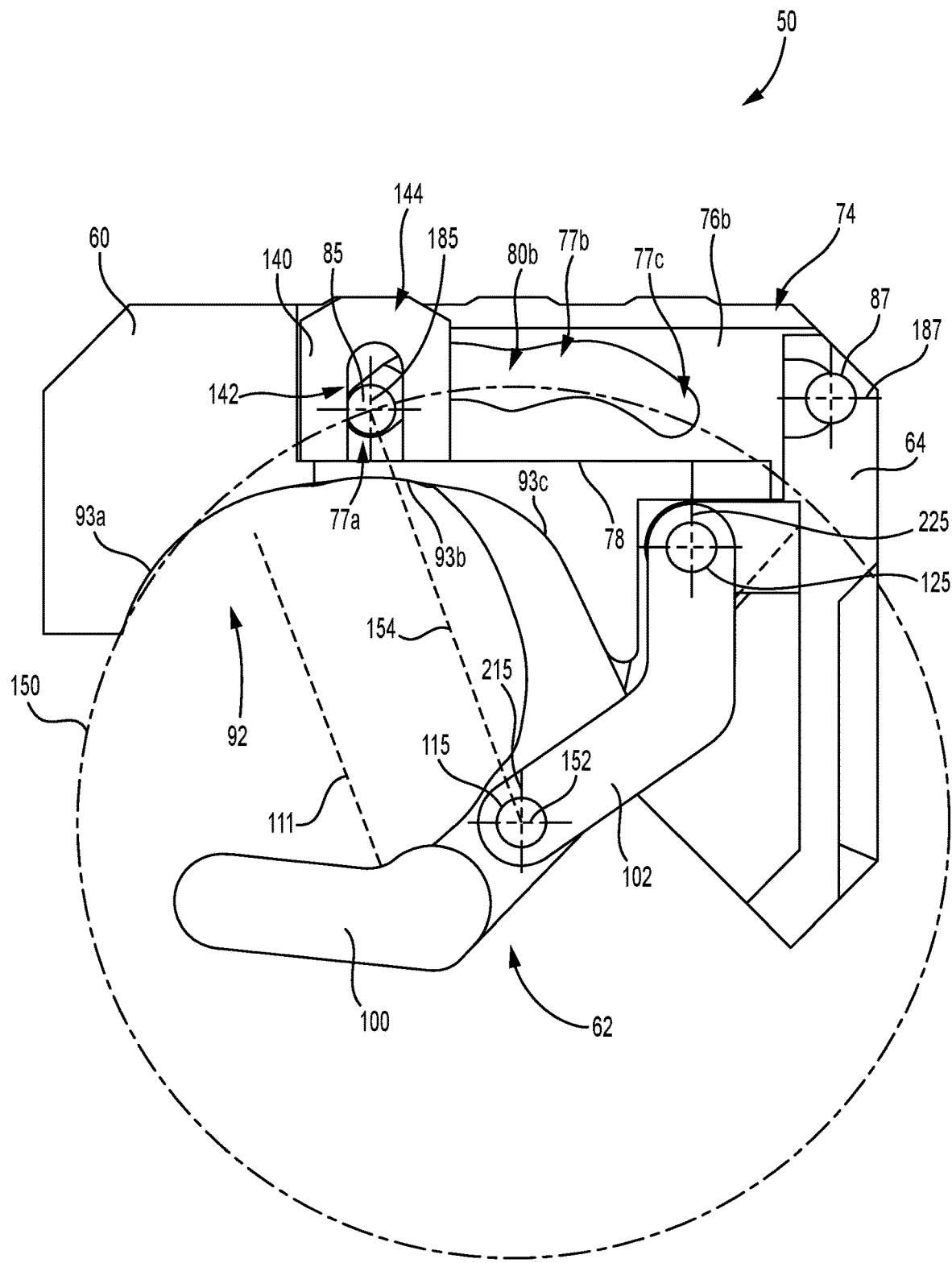
FIG. 5 is a cross-sectional view of the mounting clamp of FIG. 1A taken across plane 5-5 of FIG. 2.

As best seen in FIG. 5, the body 60 defines a plurality of pivots pivotably connecting the body 60, jaw 62 and the actuator 64 together. In this embodiment, the plurality of pivots includes a first pivot, a second pivot, a third pivot and a fourth pivot. Each of these pivots will be described in greater detail below.

Referring to FIGS. 1A, 1B, 1C and 2, the body 60 will now be described in detail. The body 60 has a front portion, a rear portion opposite to the front portion, a top surface, a bottom surface opposite to the top surface, a left portion and a right portion opposite to the left portion. Furthermore, the body 60 defines a longitudinal center plane 5.

Figure 4:
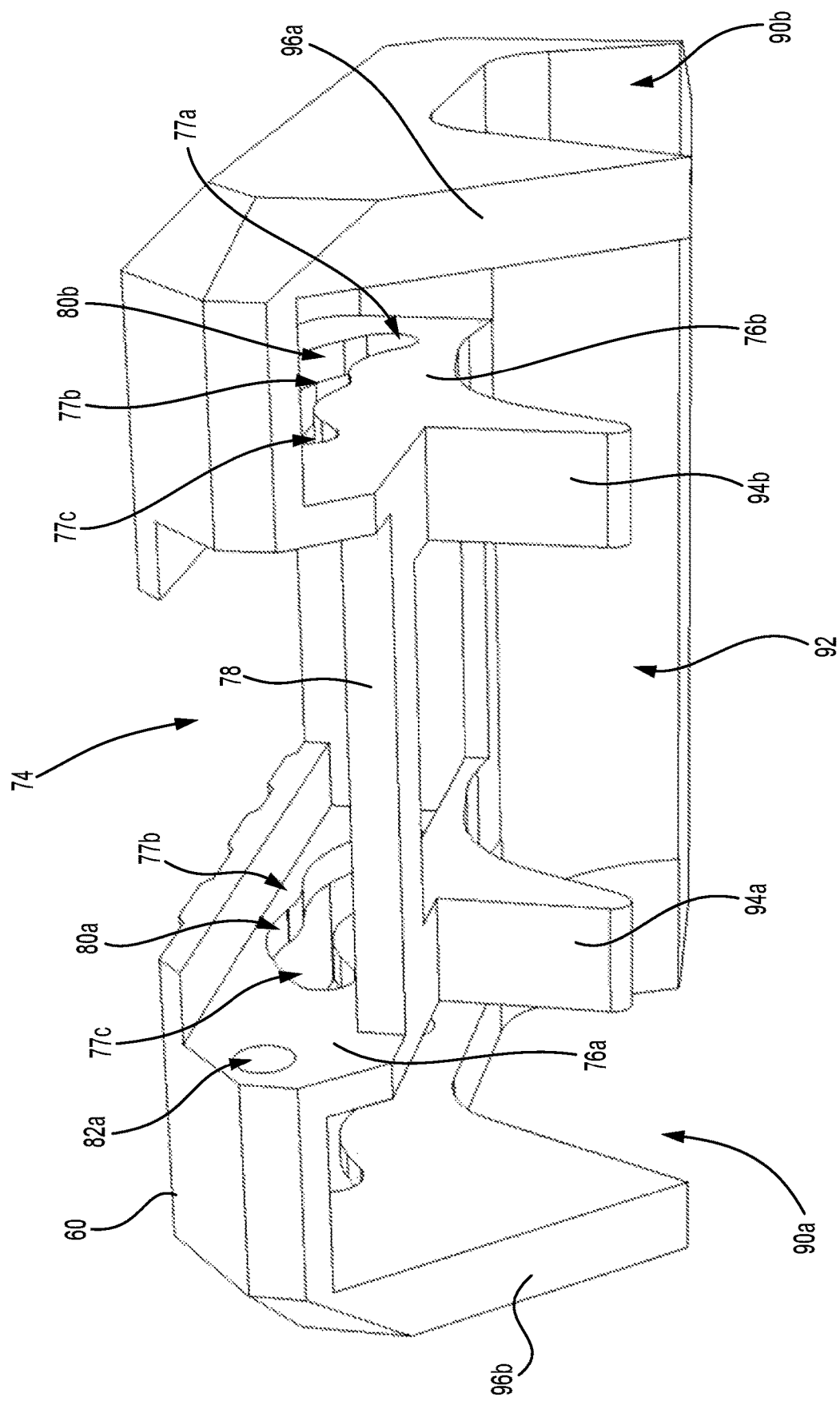
FIG. 4 is a perspective view taken from a bottom, rear, right side of a body of the mounting clamp of FIG. 1A.

As best seen in FIG. 4, the body 60 has left and right side recesses 90a, 90b defined on, respectively, the left and right portions of the body 60. Furthermore, the body 60 has a coupling portion 92 configured to engage with connecting portions, which extends upwardly from the bottom portion of the body 60 and extends laterally between the left and right side recesses 90a, 90b. The coupling portion 92 includes left and right members 76a, 76b including left and right body tabs 94a, 94b that project downwardly therefrom, respectively. It is contemplated that in some embodiments, there could be only one tab or there could be three or more tabs. It is also contemplated that in some embodiments, the left and right body tabs 94a, 94b could be omitted. The left and right body tabs 94a, 94b have a profile generally similar to a profile of the left and right side recesses 90a, 90b, which can, in some instances, help enhance engagement between the body 60 and the connecting portions 54a, 54b, 54c. As best seen in FIG. 5, the coupling portion 92 has an arcuate section 93a, an arcuate section 93b and an arcuate section 93c. The arcuate sections 93a, 93b, 93c have an arc radius that is complementary to the radius of the connecting portions 54a, 54b, 54c, respectively.

Figure 9A:
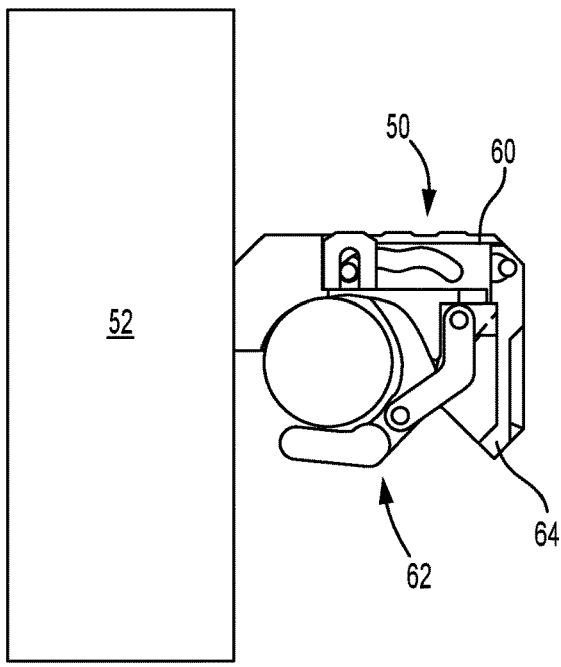
FIG. 9A is a schematic side elevation view of the mounting clamp of FIG. 1A coupling a case to a connecting portion of a structure.
Figure 9B:
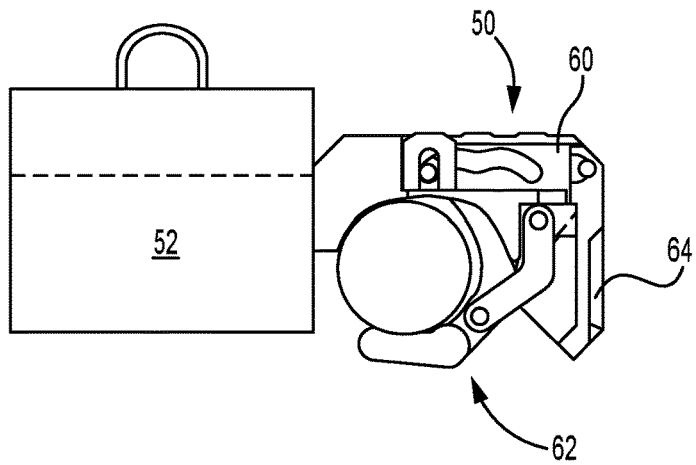
FIG. 9B is a schematic side elevation view of the mounting clamp of FIG. 1A coupling a toolbox to a connecting portion of a structure.
Figure 9C:
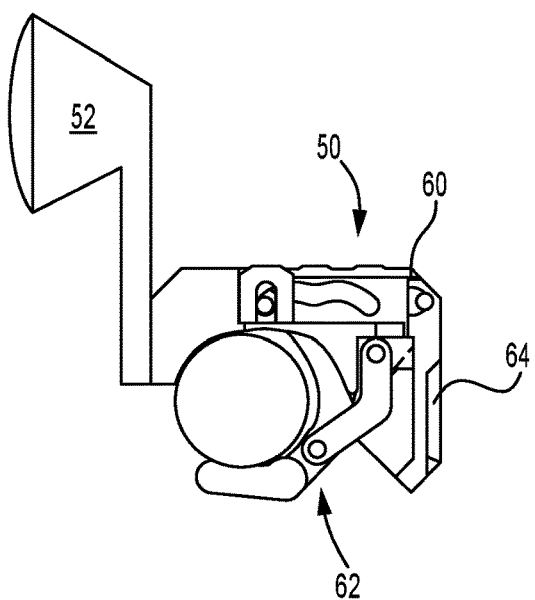
FIG. 9C is a schematic side elevation view of the mounting clamp of FIG. 1A coupling a light structure to a connecting portion of a structure.
Figure 10:
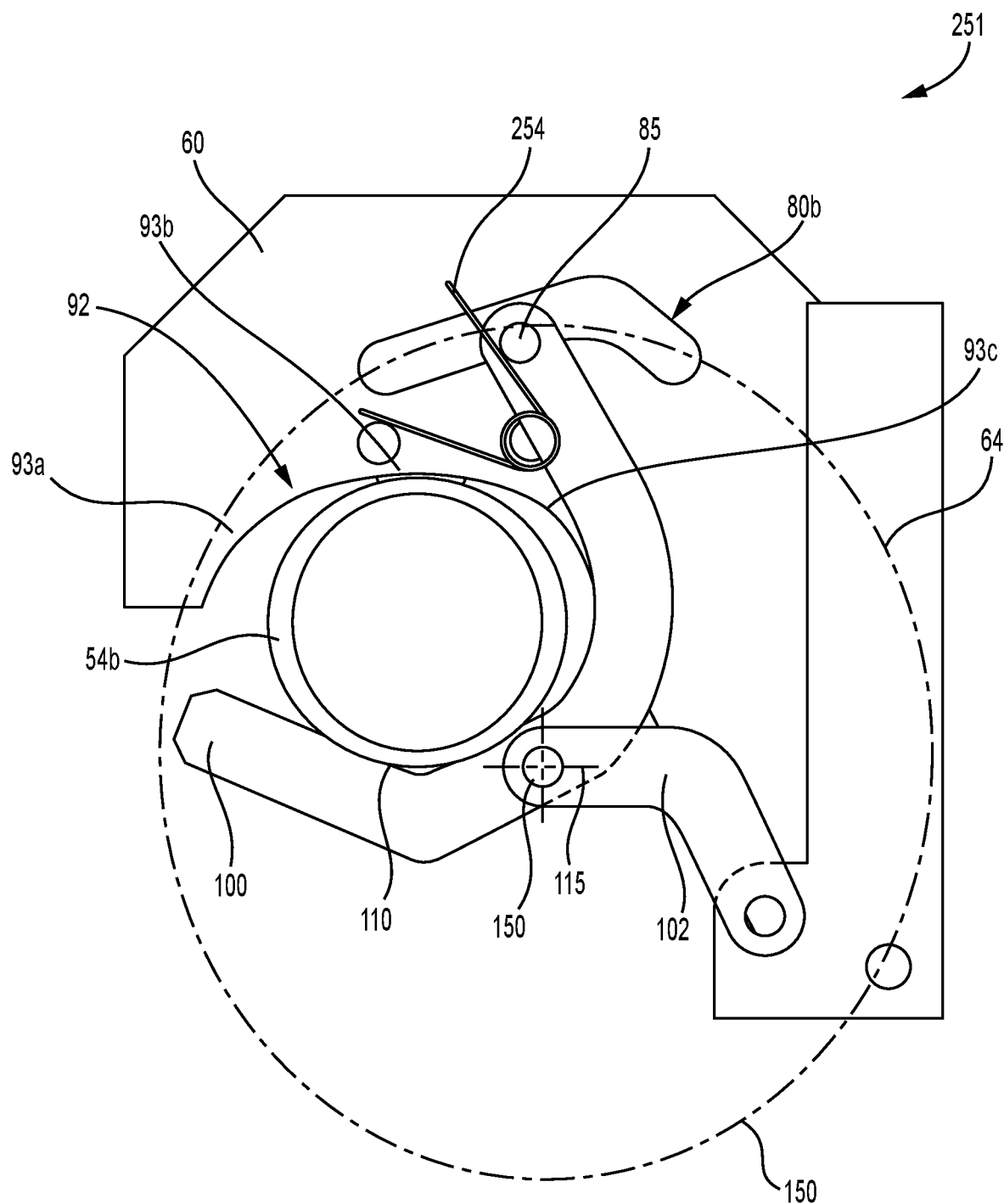
FIG. 10 is a schematic side elevation view of an alternative embodiment of a mounting clamp according to the present technology.

As best seen in FIG. 2, the front portion of the body 60 has a mounting interface 70 that is configured to engage with an accessory 52 (shown in FIGS. 9A, 9B and 9C). It is contemplated that in some embodiments, the mounting interface 70 could be disposed elsewhere on the body 60, such as, for example, on the top surface thereof. As an example, the mounting interface 70 defines two laterally spaced apertures 72a, 72b that are configured to receive fasteners (not shown) therein. Thus, the fasteners are configured to connect the accessory 52 to the body 60. It is contemplated that in some embodiments, the apertures 72a, 72b could be omitted, and that the mounting interface 70 could be configured to engage with and connect to the accessory 52 differently, such as, for instance, with an adhesive. It is contemplated that the accessory 52 and the mounting clamp 50 could be unitary. For instance, the body 60 can be integrated to the accessory 52 (e.g., the body 60 and the accessory 52 could be molded together, thereby forming one single piece). As further described below, the accessory 52 could include more than one mounting clamp 50 for mounting the accessory 52 on one structure or on a plurality of structures on a vehicle.

Multiple types of accessories are contemplated in the present technology. Examples of accessories are provided in FIGS. 9A to 9C, but the accessory 52 is not limited to these examples. In FIG. 9A, the accessory 52 is a case configured to store objects therein. In FIG. 9B, the accessory 52 is a toolbox. In FIG. 9C, the accessory 52 is a light fixture. It is contemplated that in other embodiments, the accessory 52 could be another item such as a bag, a rack, a storage bin, a gas tank, a gun case, a camera, a chainsaw, a shovel, and/or any accessory to be mounted on a vehicle. In some embodiments, the accessory 52 and the mounting clamp 50 could be provided as a kit. In other embodiments, the accessory 52 could be configured to connect to more than one mounting clamp 50. In other embodiments, the accessory 52 could be configured to connect to more than one structure.

Figure 3:
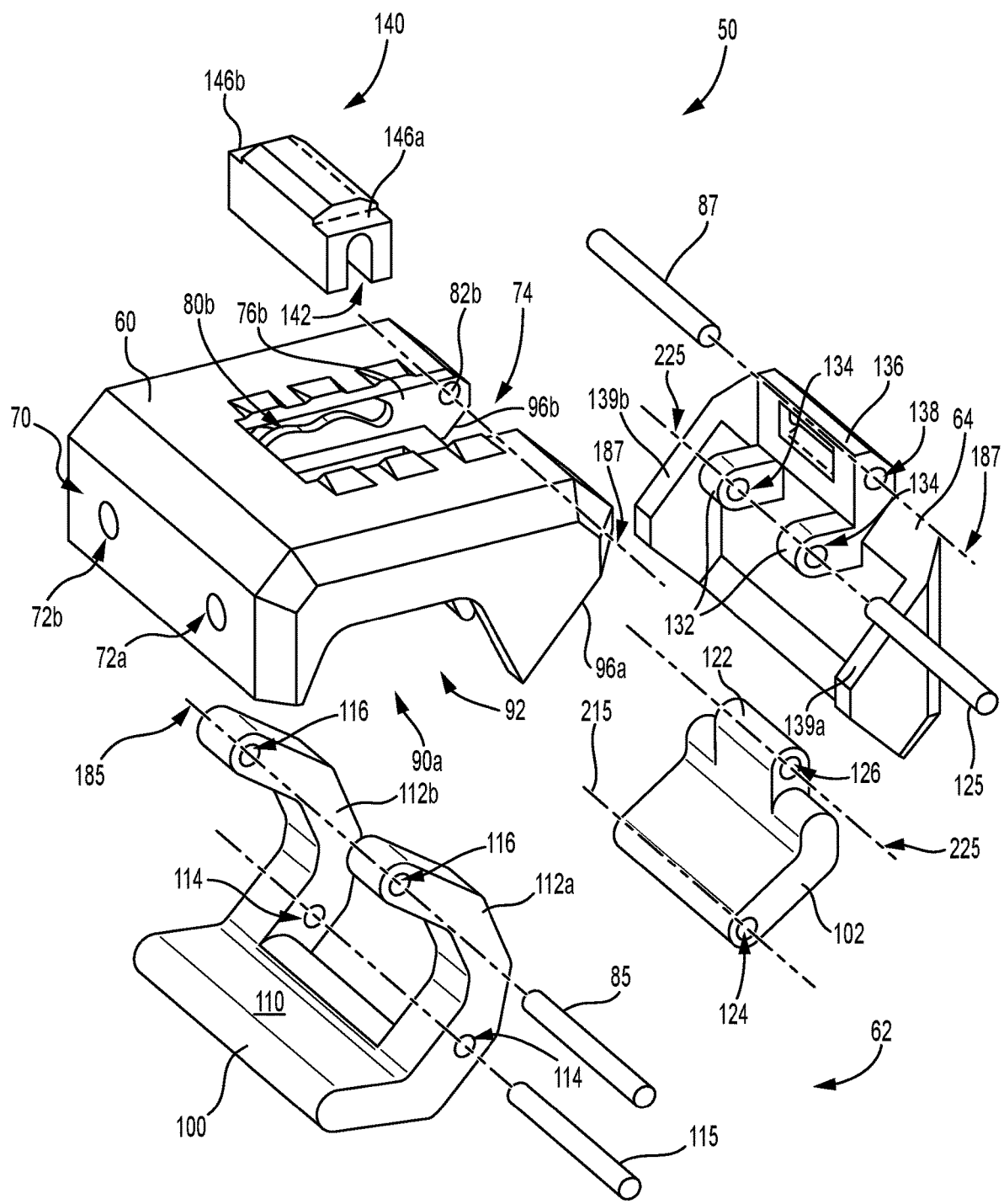
FIG. 3 is an exploded perspective view taken from a top, front, left side of the mounting clamp of FIG. 1A.

Referring to FIG. 3, the actuator 64 is pivotally connected to the body 60 about the first pivot, which in this embodiment acts as an actuator pivot, defining a first pivot axis 187 via a first pin 87 that is received in two connecting recesses 82a, 82b that are defined in the body 60, generally near the rear portion of the body 60. The first pin 87 is also received in an aperture 138 that is defined in the actuator 64.

Referring to FIGS. 2 to 5, the body 60 defines a rear recess 74 extending through part of the top portion and part of the rear portion of the body 60. As best seen in FIG. 4, the rear recess 74 exposes the left and right members 76a, 76b and a platform 78 that extends between the left and right members 76a, 76b and that is vertically below the top surface of the body 60.

The jaw 62 is pivotally connected to the body 60 about a second pivot, which in this embodiment acts as a jaw pivot, defining a second pivot axis 185 via a second pin 85 sometimes referred to as moveable pivot 85. Parts of the moveable pivot 85 is received in guides 80a, 80b, which are respectively disposed on the left and right members 76a, 76b.

In the present embodiment, the guides 80a, 80b are guiding slots 80a, 80b. In other embodiments, the guiding slots 80a, 80b could be other guides such as, for example, guiding rails. The guiding slots 80a, 80b are generally arcuate and define a leading position of the moveable pivot 85, an intermediate position of the moveable pivot 85 and a trailing position of the moveable pivot 85. The moveable pivot 85 is selectively moveable from one position to another.

In more detail, in the present embodiment, each of the guiding slots 80a, 80b defines a leading recess 77a corresponding to the leading position of the moveable pivot 85, an intermediate recess 77b corresponding to the intermediate position of the moveable pivot 85 and a trailing recess 77c corresponding to the trailing position of the moveable pivot 85. As will be described in greater detail below, the leading, intermediate and trailing positions of the moveable pivot 85 and thus the leading, intermediate and trailing recesses 77a, 77b, 77c are generally positioned on a periphery (border) of a virtual circle 150 (shown in FIG. 5). Thus, the intermediate recess 77b is vertically offset from the leading and trailing recesses 77a, 77c and the guiding slots 80a, 80b form an "M" shape. Other shapes are contemplated as well, especially in cases where more or less than three positions or recesses are present. As will be described below, this can help ensure that the mounting clamp 50 clamps to connecting portions 54a, 54b, 54c with generally equal clamping forces.

In other embodiments, the guiding slots 80a, 80b could be defined elsewhere along the body 60. For instance, the guiding slots 80a, 80b could be defined along the outer sidewalls of the body 60. It is also contemplated that in some embodiments, the guiding slots 80a, 80b could be defined elsewhere along the mounting clamp 50. For instance, the guiding slots 80a, 80b could be defined on the jaw 62. It is also contemplated that in some embodiments, there could be one guide or there could be three or more guides. In some embodiments, the guiding slots 80a, 80b could be omitted altogether. In such embodiments, the body 60 could define leading, intermediate and trailing apertures corresponding to, respectively, the leading, intermediate and trailing positions of the moveable pivot 85, where the moveable pivot 85 is selectively received in the desired aperture.

Furthermore, the rear recess 74 is configured to receive a retaining member 140, such as a slider, for selectively setting the mounting clamp 50 in one of the pre-determined configurations adapted for clamping a given one of the connecting portions 54a, 54b, 54c. The retaining member 140 is configured to slide within the rear recess 74 on the platform 78. The retaining member 140 has, on a top surface thereof, a handling portion 144, which is configured to project from the rear recess 74 when the retaining member 140 rests on the platform 78. As such, a user can easily grasp the retaining member 140. On left and right sides of the handling portion 144, the retaining member 140 respectively has left and right flat portions 146a, 146b. The left and right flat portions 146a, 146b are configured to engage with an inner surface of the upper wall of the body 60 and thus maintain the retaining member 140 within the rear recess 74 (i.e., prevent the retaining member 140 from accidentally slipping out through the rear recess 74). Furthermore, the retaining member 140 also defines a pivot receiving recess 142 extending along an entire width thereof, and from a bottom side of the retaining member 140 towards a top side thereof. Due to the pivot receiving recess 142, when the moveable pivot 85 is received in the retaining member 140, the moveable pivot 85 can move along a vertical direction of the retaining member 140 (i.e., moveable pivot 85 is slidingly received in the retaining member 140). Thus, the transition of the moveable pivot 85 from one position to another along the guide slots 80a, 80b is facilitated by sliding the retaining member 140 longitudinally within the rear recess 74, where the retaining member 140 drives the moveable pivot 85 longitudinally. The moveable pivot 85 thus moves simultaneously along the guides 80a, 80b and along the pivot receiving recess 142 from one of the leading, intermediate and trailing positions to another, or from one leading, intermediate and trailing positions recesses 77a, 77b, 77c to another. In other words, the user can selectively change the position of the moveable pivot 85 by sliding the retaining member 140 forward or backward, without requiring any tool. It is understood that in some embodiments, the retaining member 140 can be omitted and the moveable pivot 85 could be moved differently along the guides 80a, 80b to adjust the mounting clamp 50. In addition, it is understood that the retaining member 140 could be replaced by any equivalent structure that can provide a translational movement of the moveable pivot 85 along the guides 80a, 80b, such as a worm screw, a knob, a rack and pinion, for example.

At the rear portion of the body 60, the body 60 includes rear abutting portions 96a, 96b configured to abut the actuator 64 when the actuator 64 reaches a closed position.

Still referring to FIGS. 2 to 5, the jaw 62 will now be described in detail. The jaw 62 has a front member 100 and a rear member 102.

The front member 100, which is pivotally connected to the body 60 via the moveable pivot 85, has an angled portion 110 that extends laterally and that is configured to engage with the connecting portions 54a, 54b, 54c. In this embodiment, the angled portion 110 is v-shaped and defines a virtual bisector line 111 (shown in FIG. 5). The front member 100 also has left and right laterally spaced members 112a, 112b that are arcuate, and that extend upwardly from the angled portion 110. It is understood that the angled portion 110 could be shaped differently, with one or multiple arcs, for example. The members 112a, 112b each define an upper aperture 116 in which the moveable pivot 85 is received. The members 112a, 112b also each define a lower aperture 114 in which, as will be described below, a jaw pivot 115 is received. Since the moveable pivot 85 enables a moveable pivotal connection between the jaw 62 and the body 60, the front member 100 is selectively moveable between a leading position, an intermediate position and a trailing position by moving the moveable pivot 85, as mentioned above, between the leading, intermediate, and trailing positions.

The rear member 102 is pivotally connected to the front member 100 and pivotally connected to the actuator 64. More specifically, the rear member 102 is pivotally connected to the front member 100 about a third pivot, which in this embodiment acts as a jaw pivot 115 defining a third pivot axis 215 via a third pin 115. The jaw pivot 115 is received in a lower aperture 124 of the rear member 102 and the lower apertures 114 of the front member 100. Furthermore, the rear member 102 is pivotally connected to the actuator 64 at an end opposite to the jaw pivot 115 about a fourth pivot, which in this embodiment acts as a connecting pivot 125, defining a fourth pivot axis 225 via a fourth pin 125. The fourth pin 125 is received in an upper aperture 126 defined in the rear member 102, and apertures 134 defined in the actuator 64. The rear member 102 is angled to conform to the arcuate shape of the front member 100. It is contemplated that in some embodiments, the rear member 102 could be shaped differently. For example, the rear member 102 could be curved. In this embodiment, the rear member 102 is laterally sized to fit between the left and right extending members 112a, 112b of the front member 100.

It is understood that the rear member 102 acts as a linkage between the front member 102 and the actuator 64. It is contemplated that in some embodiments, the jaw 62 could include additional members. It is also contemplated that in some embodiments, the jaw 62 could include a single member pivotally connected to the actuator 64. It is also further contemplated that the jaw 62 could be a single member engaging the actuator 64, without being pivotally connected thereto.

The jaw 62 is selectively adjustable between an open position and a closed position. As will be described below, when the jaw 62 is in the closed position, the jaw 62 is configured to clamp to a connecting portion, and when the jaw 62 is in the open position, the jaw 62 is configured to, if the jaw 62 was previously clamping onto the connecting portion, release the connecting portion.

Still referring to FIGS. 2 to 5, the actuator 64 will now be described. The actuator 64 is a lever 64 that is operable manually (i.e., without the need for any specialized tool). It is contemplated that in other embodiments the actuator 64 could be a handle, a knob or any other equivalent actuation device.

The actuator 64 has two tabs 132 that extend generally perpendicularly away from a surface of the actuator 64, toward a front side of the body 60. It is contemplated that in some embodiments, the actuator 64 could have more or less than two tabs. Each of the two tabs 132 defines an aperture 134 configured to receive the connecting pivot 125 therein. The actuator 64 also has an upper connecting portion 136 (best seen in FIG. 3) that defines an aperture 138 configured to receive the actuator pivot 87. The actuator pivot 187 provides a pivotal connection between the actuator 64 and the body 60.

The actuator 64 further has left and right abutting portions 139a, 139b that are generally complementary to and configured to abut, respectively, the left and right abutting portions 96a, 96b of the body 60. As will be described below, the actuator 64 can be actuated to selectively open the mounting clamp 50 (open state) and close the mounting clamp 50 (close state) by operatively moving the jaw 62 accordingly. In the embodiment shown in FIGS. 1 to 5, the actuator 64 is said to be in closed position when pointing generally downwardly and in open position when pointing generally upwardly. Other configurations are contemplated as well, such as pointing generally upwardly/downwardly or pointing generally left/right in closed/open positions, respectively, for example.

The operation of the mounting clamp 50 will now be described in detail to illustrate the cooperative action of its parts. As mentioned above, the body 60, jaw 62, and actuator 64 form a quick-action mounting clamp that is adjustable to clamp to different connecting portions 54a, 54b, 54c of pre-determined sizes for coupling an accessory to the connecting portion. In addition, it is to be noted that the clamping force applied by the mounting clamp 50 on said different connecting portions is pre-determined, and generally equal for each connecting portion. Furthermore, the mounting clamp 50 can be operated without requiring any tool.

The pivotal connection between the jaw 62 and the actuator 64 is such that in response to the actuator 64 being actuated, the jaw 62 is adjusted between open and closed positions. Additionally, the pivotal connection between the jaw 62 and the body 60 is moveable, because of the moveable pivot 85. Thus, the mounting clamp 50 can be selectively adjusted between leading, intermediate and trailing configurations. In this embodiment, the mounting clamp 50 has been designed to clamp onto three different connecting portions (i.e., three different sizes of structure member), thus the mounting clamp 50 is adjustable between three configurations, and the moveable pivot 85 is adjustable between three positions. It is contemplated that in some embodiments, the moveable pivot 85 could be adjustable between more or less than three positions such that the mounting clamp 50 would also be adjustable between more or less than three configurations.

Figure 6A:
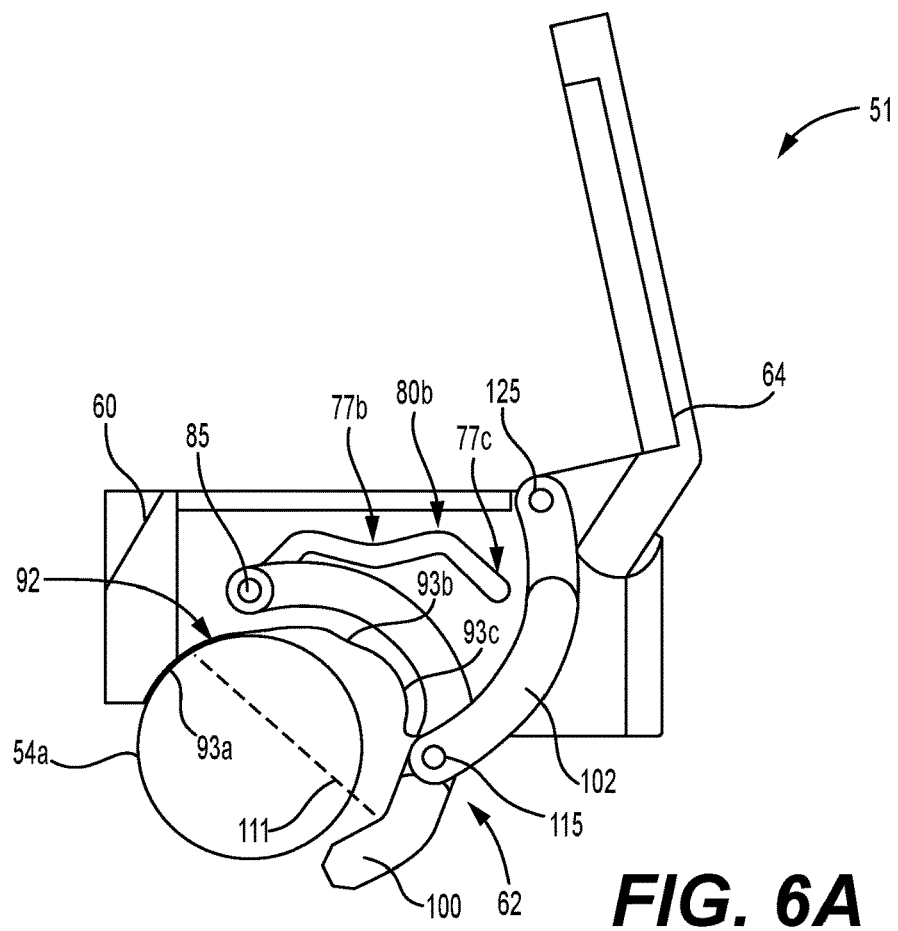
FIG. 6A is a schematic side elevation view of an alternative embodiment of a mounting clamp according to the present technology in a leading configuration with a jaw of the mounting clamp being in an open position.
Figure 6B:
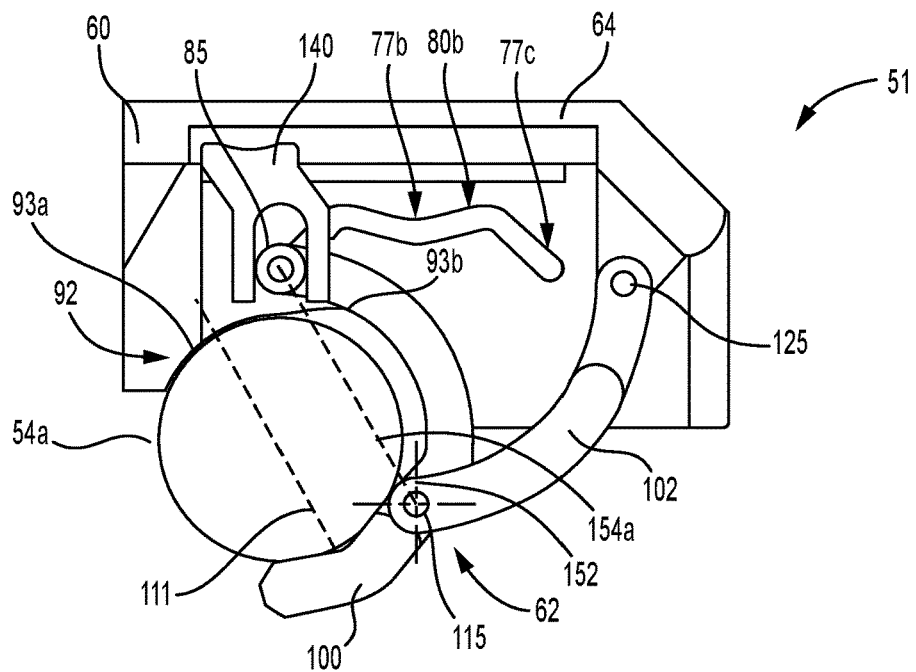
FIG. 6B is a schematic side elevation view of the mounting clamp of FIG. 6A with the jaw of the mounting clamp being in a closed position.
Figure 7A:
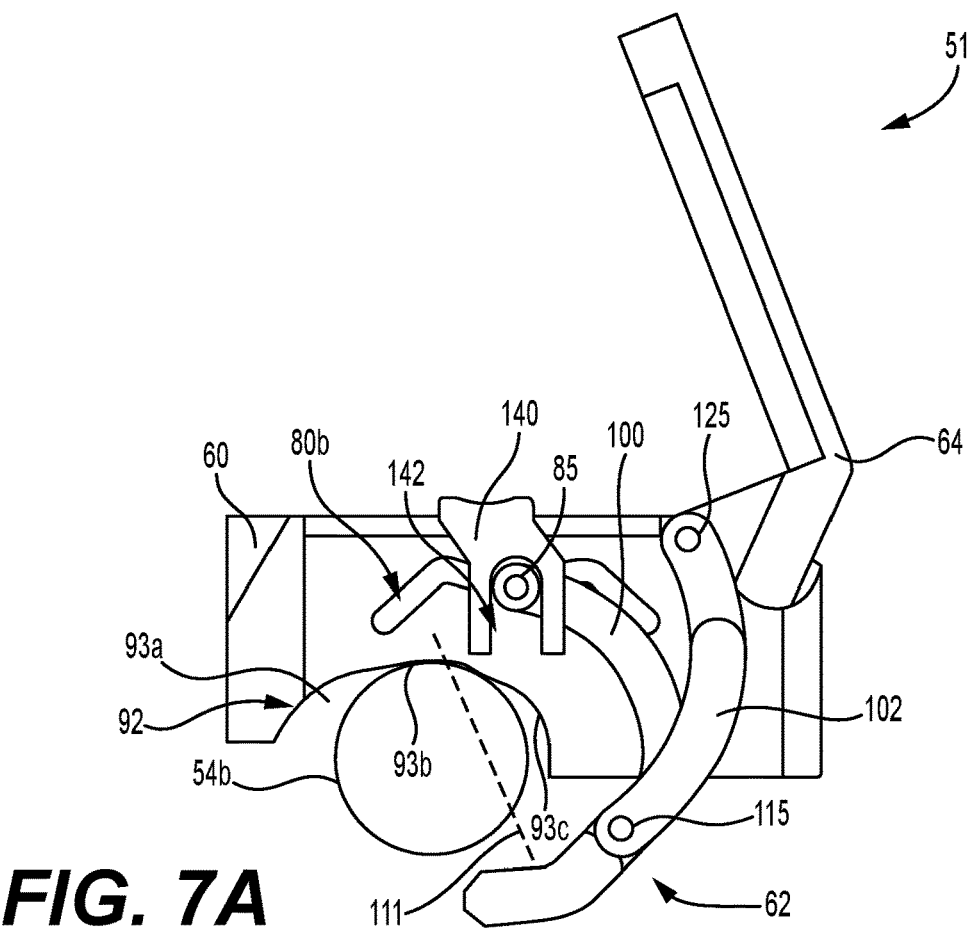
FIG. 7A is a schematic side elevation view of the mounting clamp of FIG. 6A in an intermediate configuration, with a jaw of the mounting clamp being in an open position.
Figure 7B:
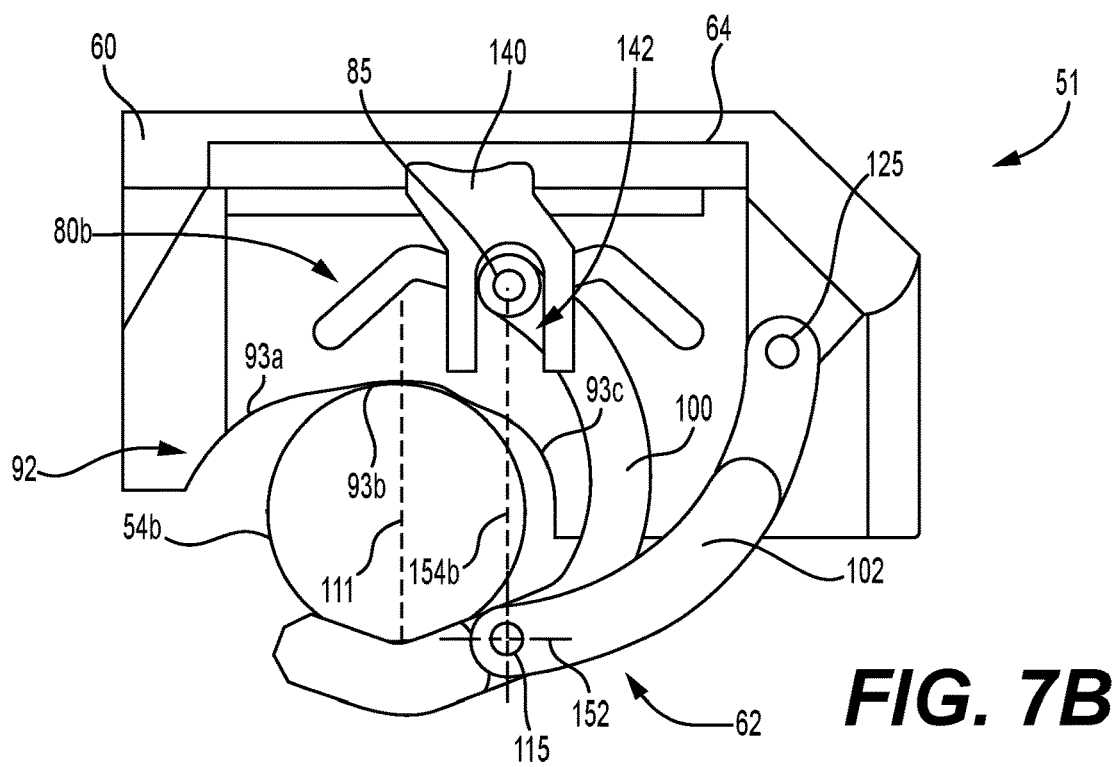
FIG. 7B is a schematic side elevation view of the mounting clamp of FIG. 7A with the jaw of the mounting clamp being in a closed position.
Figure 8A:
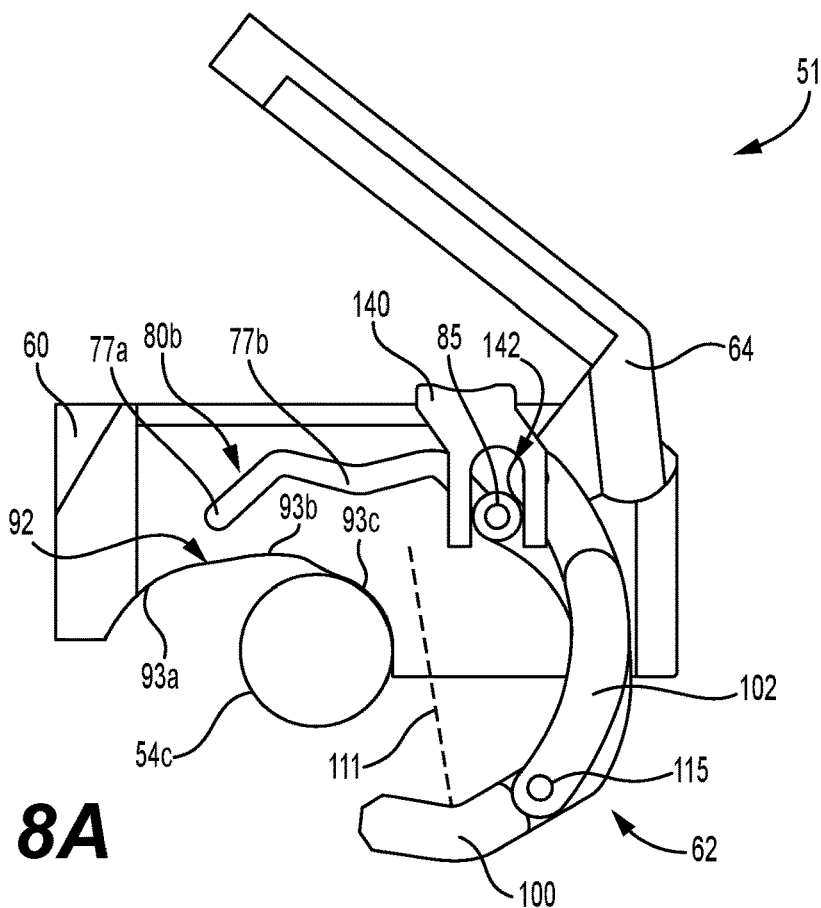
FIG. 8A is a schematic side elevation view of the mounting clamp of FIG. 6A in a trailing configuration, with a jaw of the mounting clamp being in an open position.
Figure 8B:
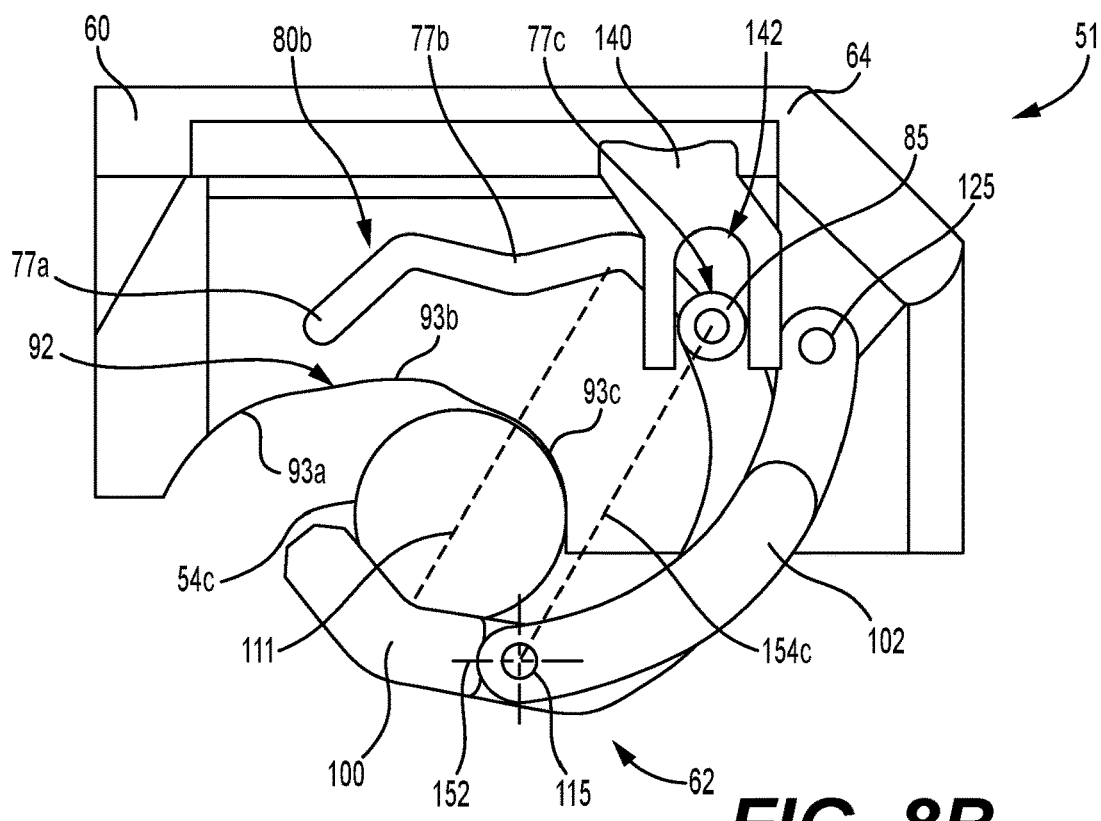
FIG. 8B is a schematic side elevation view of the mounting clamp of FIG. 8A with the jaw of the mounting clamp being in a closed position.

In each of the leading, intermediate and trailing configurations, the jaw 62 is adjustable between the open position (shown in FIGS. 6A, 7A, 8A) and the closed position (shown in FIGS. 6B, 7B, 8B).

With continued reference to FIGS. 1 to 5, in order to move the jaw 62 to the open position, the actuator 64 is actuated so as to pivot about the actuator pivot axis 187 in an anti-clockwise direction. In response to the actuator 64 being actuated, the connecting pivot 125 pivots about to the actuator pivot axis 187, such that the connecting pivot 125 moves away from the front of the body 60. The jaw pivot 115 pivots about to the moveable pivot axis 185, such that the jaw pivot 115 also moves away from the front of the body 60. This results in the jaw 62 being moved away from the coupling portion 92 (i.e., the jaw 62 is moved toward the open position) until the mounting clamp 50 is in the open state. As mentioned above, being that the actuator 64 is a lever, the lever simply has to be manipulated in the correct direction, once again without requiring any specialized tool. It is understood that in this embodiment, actuation of the actuator 64 is required to open the mounting clamp 50 for safety purposes, instead of requiring actuation of the actuator 64 to close the mounting clamp 50, but other configurations are contemplated as well.

When the mounting clamp 50 is in the open state, before a specific structure member is received in the coupling portion 92, the mounting clamp 50 is adjusted to a configuration in which the mounting clamp 50 is adapted to clamp said specific structure member. More specifically, the retaining member 140 is moved within the rear recess 74, which causes the moveable pivot 85 to move along the guides 80a, 80b to a predetermined position that corresponds with the size of the specific structure member to be clamped. For instance, referring to FIG. 1A, if the structure member to be clamped is the connecting portion 54a, the moveable pivot 85 is moved to the leading position 77a. In another example, referring to FIG. 1B, if the structure member to be clamped is the connecting portion 54b, the moveable pivot 85 is moved to the intermediate position 77b. In another example, referring to FIG. 1C, if the structure member to be clamped is the connecting portion 54c, the moveable pivot 85 is moved to the trailing position 77c.

In any configuration, to move the jaw 62 to the closed position, the actuator 64 is actuated. In the illustrated embodiment, the actuator 64 is actuated such that the actuator 64 pivots about the actuator pivot axis 187 toward the front of the body 60 (i.e., clockwise direction). Being that the actuator 64 is a lever, the lever simply has to be manipulated in the correct direction by an operator. Thus, actuating the actuator 64 is a quick process that can be done manually, without the use of any specialized tool. In response to the actuator 64 being actuated toward the front of the body 60, the connecting pivot 125 pivots about to the actuator pivot axis 187, such that the connecting pivot 125 moves toward the front of the body 60, and the jaw pivot 115 pivots about to the moveable pivot axis 185, such that the jaw pivot 115 moves toward the front of the body 60. Eventually, the abutting portions 139a, 139b of the actuator 64 abut the abutting portions 96a, 96b of the body 60, thus indicating that the jaw 62 has reached the closed position.

In the closed state, when a structure member is received in the coupling portion 92, the mounting clamp 50 clamps said structure member. In other words, when the jaw 62 is in the closed position, the configuration of mounting clamp 50 cannot be changed (e.g., cannot go from a leading configuration to an intermediate configuration).

Furthermore, the mounting clamp 50 is configured to provide optimal clamping conditions for securing an accessory to each of the different pre-determined structure members that the mounting clamp 50 is designed to receive, as will now be described in detail.

When the mounting clamp 50 is in closed position and clamped on a structure member, the moveable pivot 85 is positioned in one of the leading, intermediate and trailing positions (i.e., leading, intermediate and trailing recesses 77a, 77b, 77c) corresponding to the size of the clamped structure member. As best seen on FIG. 5, these positions are located on the border of the virtual circle 150 (i.e., tangent). More specifically, when the moveable pivot 85 is at one of the leading, intermediate and trailing positions, the moveable pivot 85 is disposed on the border of the virtual circle 150. A virtual center 152 of the virtual circle 150 is aligned with the jaw pivot 115. This causes the distance between the jaw pivot 115 and the moveable pivot 85 to remain constant regardless of whether the moveable pivot is in the leading, intermediate and trailing positions. As a result, the mounting clamp 50, for each configuration, provides an equal or constant clamping force on the structure member.

Additionally, the virtual bisector line 111 (shown in FIG. 5), which illustrates the orientation of the clamping force that the mounting clamp 50 is configured to apply to the structure member (not shown in FIG. 5), is oriented from the jaw 62 toward the coupling portion 92 and is generally parallel to a virtual line 154 that extends between the jaw pivot 115 to the moveable pivot 85. This applies when the moveable pivot 85 is in the leading, intermediate and trailing positions, as shown on FIGS. 6B, 7B, and 8B, respectively. It is understood that the orientation of the virtual bisector line 111 (i.e., orientation of the clamping force) is driven by the position of the moveable pivot 85 within the guides 80a, 80b, which is selected based on the specific size of the structure member that is to be clamped. Moreover, the virtual bisector line 111 is thus oriented toward the specific arcuate section (93a, 93b, 93c) corresponding to said specific size of structure member to be clamped. For example, referring to the FIGS. 1A and 5, the mounting clamp 50 is set for clamping the connecting portion 54a, with the moveable pivot 85 being positioned in the leading position (i.e., moveable pivot 84 is in the leading recess 74a). When the jaw 62 is closed (i.e., mounting clamp 50 is in the closed state), the connecting portion 54a is sandwiched between the arcuate section 93a of the body 60 and the angled portion 110 of the jaw 62, such that the clamping force applied to the connecting portion 54a (illustrated by the virtual bisector line 111) is oriented toward the arcuate section 93a, and is generally parallel to a virtual line 154a extending from the jaw pivot 115 to the moveable pivot 85. As shown on FIGS. 6B, 7B, and 8B, the same applies to other configurations of the mounting clamp 50, which ensures that the mounting clamp 50 provides an equal or constant clamping force in terms of orientation in every configuration.

Moreover, the relative positions of the actuator pivot 87, the jaw pivot 115 and the connecting pivot 125 define an overcenter mechanism that can assist in preventing the mounting clamp 50 being unintentionally unlatched.

It is appreciated that these aspects of the present technology collaborate to provide optimal clamping conditions, regardless of which configuration the mounting clamp 50 is in (i.e., clamping conditions of the mounting clamp 50 do not are not negatively impacted due to position of the moveable pivot 85).

Referring now to FIGS. 6A, 6B, 7A, 7B, 8A and 8B, an alternative embodiment of the mounting clamp 50, namely mounting clamp 51, is depicted. Features of the mounting clamp 51 that are similar to those of the mounting clamp 50 have been labeled with the same reference numerals, and will not be described again in detail. One notable difference between the mounting clamp 51 and the mounting clamp 50, is that the actuator 64, when in the mounting clamp 50 is in the closed state, is configured to engage the top surface of the body 60 instead of a rear thereof.

Referring to FIGS. 6A, 7A and 8A, the mounting clamp 51 is shown in the open state. In FIG. 6A, the moveable pivot 85 is in the leading position, such that the mounting clamp 51 is configured to clamp to the connecting portion 54a. In FIG. 7A, the moveable pivot 85 is in the intermediate position, such that the mounting clamp 51 is configured to clamp to the connecting portion 54b. In FIG. 8A, the moveable pivot 85 is in the trailing position, such that the mounting clamp 51 is configured to clamp to the connecting portion 54c.

Referring to FIGS. 6B, 7B and 8B, the mounting clamp 51 is shown in the closed state. In FIG. 6B, the moveable pivot 85 is in the leading position, and the mounting clamp 51 is clamped to the connecting portion 54a. The virtual bisector line 111 is generally parallel to virtual line 154a that extends between the jaw pivot 115 and the moveable pivot 85.

In FIG. 7B, the moveable pivot 85 is in the intermediate position, and the mounting clamp 51 is clamped to the connecting portion 54b. The virtual bisector line 111 is generally parallel to virtual line 154b that extends between the jaw pivot 115 and the moveable pivot 85.

In FIG. 8B, the moveable pivot 85 is in the trailing position, and the mounting clamp 51 is configured to clamp to the connecting portion 54c. The virtual bisector line 111 is generally parallel to virtual line 154c that extends between the jaw pivot 115 and the moveable pivot 85.

It is understood that the adjustment of the mounting clamp 51 from one of the leading, intermediate and trailing configurations to another is similar to the adjustment of the mounting clamp 50, except that the actuation of the actuator 64 to move the jaw between the open and closed positions is different. It is also understood that the operation of the mounting clamp 51 is similar to the operation of the mounting clamp 51, such that the mounting clamp 51 is also configured to provide optimal clamping conditions.

Referring now to FIGS. 10, 11A, 11B, 11C, 11D and 11E, an alternative embodiment of the mounting clamps 50, 51, namely mounting clamp 251, will now be described. Features of the mounting clamp 251 that are similar to those of the mounting clamps 50, 51 have been labeled with the same reference numerals, and will not be described again in detail. One notable difference between the mounting clamps 50, 51 and the mounting clamp 251, is that the mounting clamp 251 is a self-adjusting mounting clamp. In other words, the mounting clamp 251 is automatically adjustable between one configuration to another, without any tool nor adjustment action from a user, to accommodate for the size of the connecting portion that is being engaged therewith.

The self-adjustment is notably achieved by the following features. The mounting clamp 251 has a resilient member 254 that replaces the retaining member 140. The resilient member 254 biases the moveable pivot 85 toward one of the leading, intermediate, and trailing positions such that the mounting clamp 251 is biased toward a corresponding one of the leading, intermediate, and trailing configurations. In this embodiment, the resilient member 254 biases the moveable pivot 85 toward the trailing position such that the mounting clamp 251 is biased toward the trailing configuration. In this configuration of the mounting clamp 241, an opening of the jaw 62 is at its maximum. The resilient member 254 is a torsion spring with one end connected to the moveable pivot 85, and the other end connected to the body 60. It is contemplated that in other embodiments, the resilient member 254 could be other types of biasing members such as polymeric members, compression springs and/or tension springs and/or that the resilient member 254 could be elsewhere in the assembly (e.g., connected to the front member 110 and to the body 60).

As best seen in FIGS. 10, 11A, 11B, 11C, the guiding slots 80a, 80b are configured such that when the moveable pivot 85 is in the leading, intermediate, and trailing positions, the moveable pivot 85 is on a border (periphery) of a virtual circle 150 having its center 152 on the jaw pivot 115, as in mounting clamps 50, 51. One notable difference, however, between the mounting clamps 50, 51, and 251 is that the guiding slots 80a, 80b form 'L-shaped' slots instead of 'M-shaped' slots. This 'L-shape' allows a smooth movement of the moveable pivot 85 as it is being driven by the resilient member 254, by minimizing blockage and friction of the moveable pivot 85 within the guiding slots 80a, 80b in some cases.

In operation, to have the mounting clamp 251 clamp to one of the connecting portions 54a, 54b, 54c, the one of the connecting portions 54a, 54b, 54c is disposed between the jaw 62 and the coupling portion 92, in an attempt to position the one of the connecting portions 54a, 54b, 54c in a respective one of the arcuate sections 93a, 93b, 93c. If the position of the jaw 62 does not provide enough clearance between the jaw 62 and the coupling portion 92 to let the one of the connecting portions 54a, 54b, 54c from entering in the coupling portion 92, the jaw 62 further pivots around the moveable pivot 85 until the one of the connecting portions 54a, 54b, 54c is fully engaged in corresponding one of arcuate sections 93a, 93b, 93c and in the angled portion 110 of the jaw 62. It is understood that due to the pivotal connections between the body 60, the jaw 62, and the actuator 64, same effect is obtained by pivoting the actuator 64 further around the actuator pivot 87.

The automatic adjustment of the mounting clamp 251 begins when the actuator 64 is partially actuated toward its closed position and the one of connecting portions 54a, 54b, 54c contacts the jaw 102 at a contact point C which is typically at the foremost end of it ('tip') and distal from the angled portion 110. It is noted that when the one of connecting portions 54a, 54b, 54c contacts the jaw 102 at the contact point C, the one of the connecting portions 54a, 54b, 54c is not yet received in the angled portion 110 and is thus not yet fully engaged by the jaw 102. By partially actuating the actuator 64 so as to move the jaw 62 to its closed position, the pivotal connections between the body 60, the jaw 62, and the actuator 64 cause a preliminary clamping force between the coupling portion 92 and the jaw 102 (since the one of connecting portions 54a, 54b, 54c is sandwiched therebetween). In response to the actuator 64 being rotated further, the jaw 102 rotates further about the jaw pivot. A moving force moves the moveable pivot 85 along the guiding slots 80a, 80b toward the leading position until the moveable pivot 85 reaches its final position in accordance with the size of the one of connecting portions 54a, 54b, 54c engaged in the mounting clamp 251.

Figure 11A:
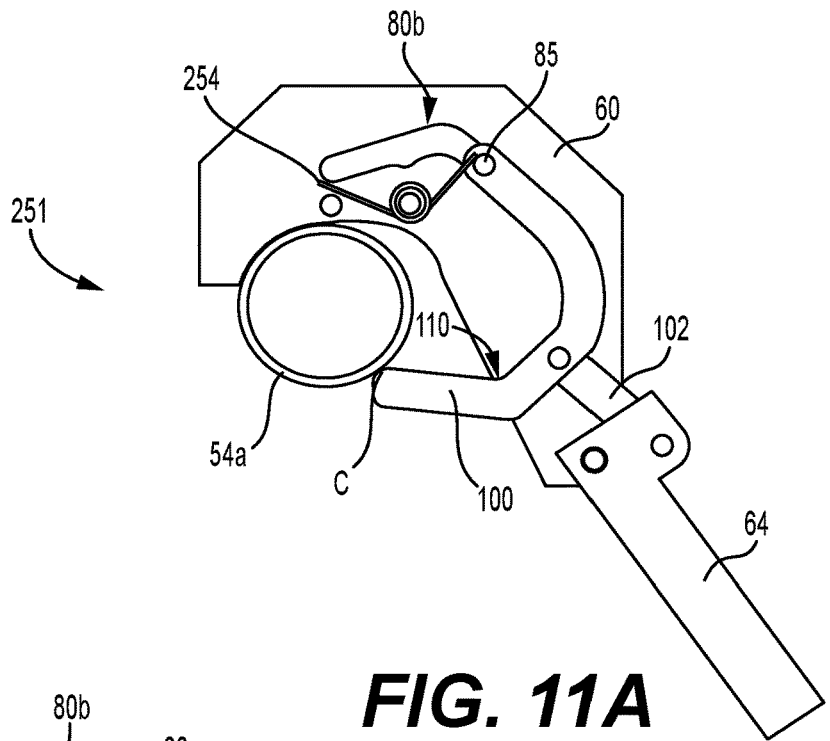
FIG. 11A is a schematic side elevation view of the mounting clamp of FIG. 10 in a trailing configuration, and a jaw of the mounting clamp being in an open position.
Figure 11B:
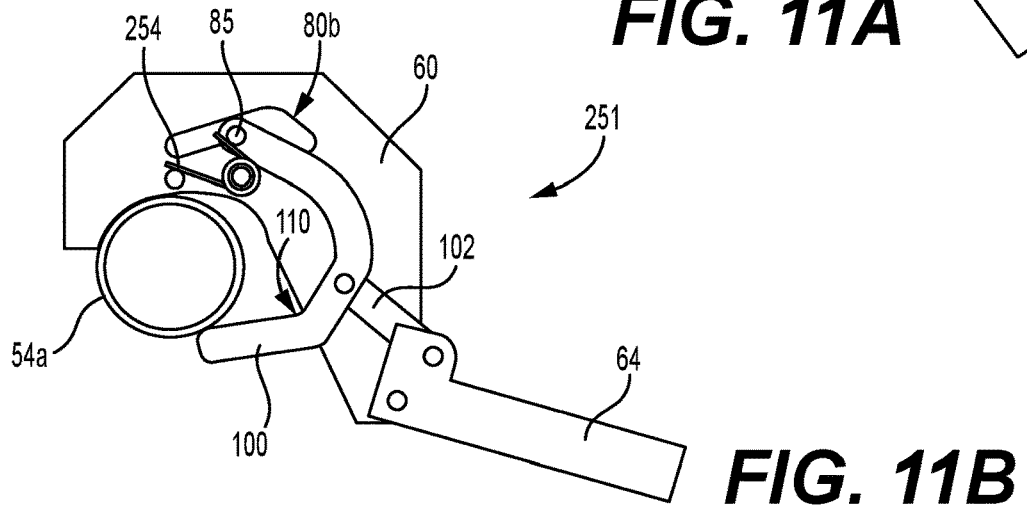
FIG. 11B is a schematic side elevation view of the mounting clamp of FIG. 10 in an intermediate configuration, and a jaw of the mounting clamp being in an open position.
Figure 11C:
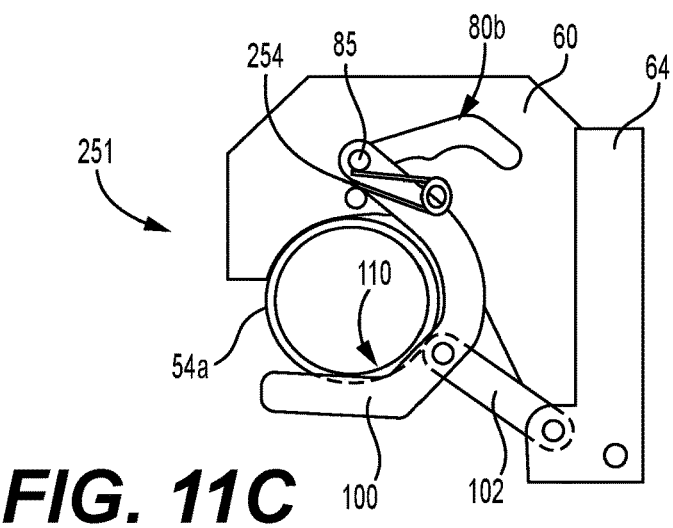
FIG. 11C is a schematic side elevation view of the mounting clamp of FIG. 10 in a leading configuration, and the jaw of the mounting clamp being in a closed position.
Figure 11D:
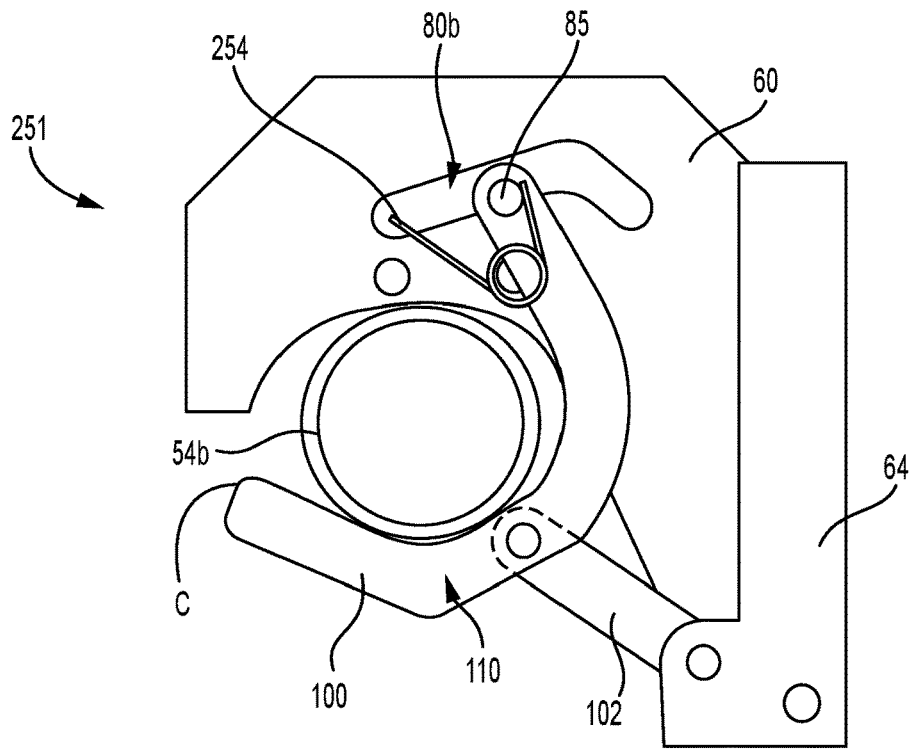
FIG. 11D is a schematic side elevation view of the mounting clamp of FIG. 10 in an intermediate configuration, and the jaw of the mounting clamp being in a closed position.
Figure 11E:
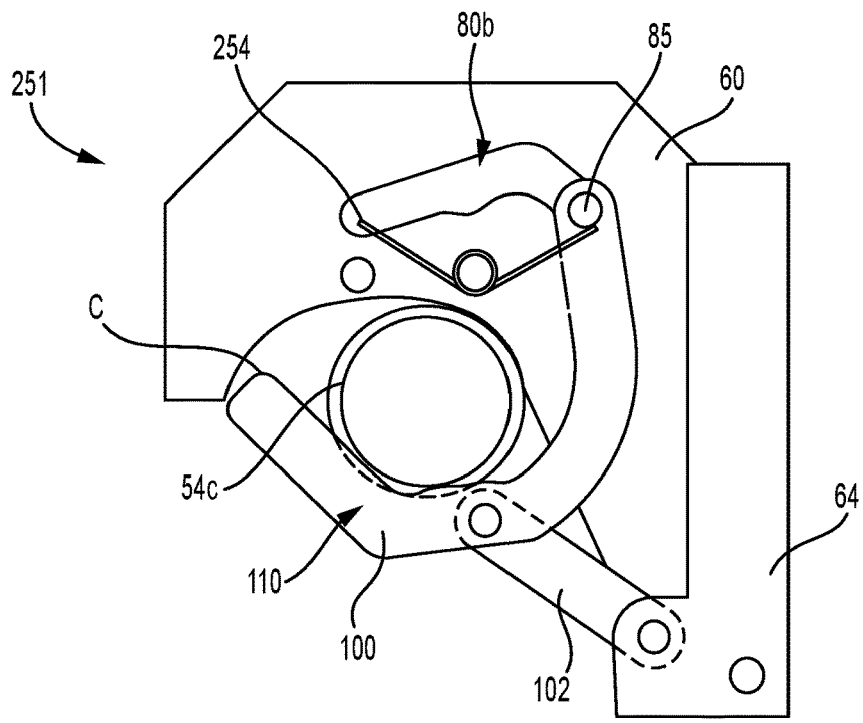
FIG. 11E is a schematic side elevation view of the mounting clamp of FIG. 10 in a trailing configuration, and the jaw of the mounting clamp being in a closed position.

For instance, referring to FIGS. 11A, 11B, and 11C, the mounting clamp 251 is initially in the trailing configuration and the jaw 62 is in the open position. In FIG. 11A, the connecting portion 54a is engaged in the corresponding arcuate section 93a of the coupling portion 92 and in contact with the jaw 62. Then, as shown in FIG. 11B, the actuator 64 is partially actuated, and the moveable pivot 85 is moved within the guiding slots 80a, 80b from its initial position (i.e., the trailing position in this embodiment) to the adjacent one (i.e., the intermediate position in this embodiment) and so on, until the moveable pivot 85 reaches its final position (i.e., the leading position in this embodiment). It is understood that the movement of the moveable pivot 85 counteracts the biasing force of the resilient member 254, which urges the moveable pivot 85 toward its initial position (i.e., the trailing position in this embodiment). The resilient member 254 is sufficiently resilient so as to form the preliminary clamping force causing the moving force moving the moveable pivot 85 toward the leading position. More precisely, the resilient member 254 biases the movable pivot 85 until the angled portion 110 effectively engages the connecting portion 54a. Then, as shown in FIG. 11C, the actuator 64 can be actuated to move the jaw 62 from the open position to the closed position, thereby clamping the connecting portion 54a. It is understood that in instances where the connecting portion 54b is used, the moveable pivot 85 would stop moving once the intermediate position is reached, as shown on FIG. 11D. In the case of the connecting portion 54c, it is understood that the moveable pivot 85 would not move since it is already in the trailing position due to biasing force of the resilient member 254, as shown on FIG. 11E.

The operation of the mounting clamp 251 is similar to the operation of the mounting clamps 50, 51, such that the mounting clamp 251 also provides optimal clamping conditions.

Referring now to FIGS. 12A to 12F, another alternative embodiment of the mounting clamp, 50, 51, 251, namely mounting clamp 351, will now be described. Features of the mounting clamp 351 that are similar to those of the mounting clamps 50, 51, 251 have been labeled with the same reference numerals, and will not be described again in detail.

One notable difference between the mounting clamps 50, 51, 251 and the mounting clamp 351 is that the mounting clamp 351 has a jaw 362 that is made of a single member, as opposed to the jaw 62 having front and rear members 100, 102 as described in prior embodiments. In the present embodiment, the jaw 362, which is pivotally connected to the body 60 about a pivot axis 360, is adjustable at least between a leading jaw position (FIG. 12D), an intermediate jaw position (FIG. 12E) and a trailing jaw position (FIG. 12F).

The jaw 362 is connected to a resilient member (not shown) that biases the jaw 362 toward the trailing position. For example, the resilient member can be similar to the resilient member 254 described in prior embodiment. The jaw 362, toward one end, has the angled portion 110 that is configured to engage the connecting portions 54a, 54b, 54c. The angled portion 110 generally defines a v-shape. In some embodiments, the angled portion 110 has another shape suitable for partially receiving the connecting portions 54a, 54b, 54c. Toward the other end, the jaw 362 has an actuator engaging portion 362. The actuator engaging portion 362 defines three recesses 364a, 364b, 364c. As will be described in greater detail below, the three recesses 364a, 364b, 364c are configured to engage the actuator 64 in accordance with reception of the connecting portions 54a, 54b, 54c, respectively.

The actuator 64, which is configured to pivot about a pivot axis 366, is operatively connectable to the jaw 362 such that actuation of the actuator 64 can result in the jaw 362 being adjusted between the open and closed positions. In this embodiment, the actuator 64 has a cam portion 65 configured to selectively engage in the recesses 364a, 364b, 364c and to selectively lock the movement of jaw 362 around the pivot 360 once the actuator is in closed position. Other configurations are contemplated as well.

Referring to FIG. 12A to 12D, the operation of the mounting clamp 351 will now be described. On FIG. 12A, the jaw 362 of the mounting clamp 351 is in the trailing position and open state, as the jaw 362 is biased toward the trailing position, and the actuator 64 is not actuated. The connecting portion 54a engages the mounting clamp 351, causing said jaw 362 to pivot about the pivot axis 360 as shown in FIG. 12B, thereby allowing insertion of the connecting portion 54a therein. Then, once the connecting portion 54a is received in the angled portion 110 (i.e., disposed in the mounting clamp 351) and in the arcuate section 93a of the coupling portion 92, due to the biasing force of the resilient member and the size of the connecting portion 54a, the jaw 362 moves to the leading position, such that the mounting clamp 351 is in the leading configuration, as shown in FIG. 12C. Then, the actuator 64 can be actuated to lock the jaw 362 in its position. Indeed, in this embodiment, actuation of the actuator 64 does not cause movement of the jaw 62, but instead, locks the jaw 62 in the position it is in. When the jaw 62 is locked in position, the mounting clamp 351 applies a clamping force to the connecting portion 54a, as shown on FIG. 12D, where the jaw 362 is locked in the leading, so that the mounting clamp 351 is in the leading configuration.

FIG. 12E shows the jaw 362 locked in the intermediate position to clamp on the connecting portion 54b, which is sandwiched between the arcuate section 93b and the angled portion 110, so that the mounting clamp 351 is in the intermediate configuration.

FIG. 12F shows the jaw 362 locked in the trailing position to clamp on the connecting portion 54c, which is sandwiched between the arcuate section 93c and the angled portion 110, so that the mounting clamp 351 is in the trailing configuration.

Thus, it is noted that, similarly to the prior embodiment, the mounting clamp 351 is configured so that when one of the connecting portions 54a, 54b, 54c is engaged in the coupling portion 92, the mounting clamp 351 adjusts its configuration in accordance with the size of the connecting portion being engaged in the coupling portion 92. In other words, when one of the connecting portions 54a, 54b, 54c is engaged in the coupling portion 92, the jaw 362 moves to the corresponding one of the leading, intermediate and trailing positions, so that the mounting clamp 351 is in the leading, intermediate or trailing configuration. It is understood that the mounting clamp 351 is said to be automatically adjustable or self-adjusting due to the presence of the resilient member (not shown) that biases the jaw 362 toward the trailing position, as described above. It is also understood that the mounting clamp 351 could be manual, (i.e., not automatically adjustable or self-adjusting if the resilient member is omitted). In such a case, the operator would have to manually adjust the jaw 362 toward the trailing position, until the mounting clamp 351 is configured in one of the leading, intermediate or trailing configurations adapted for clamping one of the connecting portions 54a, 54b, 54c.

Similarly to the prior embodiments, even if not shown on specific FIGS. 12A to 12F, it is understood that the mounting clamp 351 also has a virtual circle centered on the pivot axis 360 (i.e., "jaw pivot") and that the three recesses 364a, 364b, 364c are disposed on said virtual circle. In addition, it is also understood that the mounting clamp 351 has a virtual bisector line that extends toward the arcuate section 93a, 93b, 93c of the coupling portion 92 in accordance with the connecting portion 54a, 54b, 54c that is clamped therein. This results in that the clamping forces applied by the mounting clamp 351, between the coupling portion 92 and the angled portion 110, are generally similar in the leading, intermediate and trailing configurations, both in terms of magnitude and orientation. Thus, the mounting clamp 351 provides an optimal clamping condition, no matter which one of the connecting portions 54a, 54b, 54c is clamped.

The various components of the mounting clamps 50, 51, 251, 351 are made of conventional materials (e.g., metallic materials, such as steel or aluminum, non-metallic material, such as plastics, and/or composite materials) via conventional manufacturing processes (e.g., casting, molding, 3d printing, etc.). The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A mounting clamp for coupling an accessory to a structure, the mounting clamp comprising:
 a body having a mounting interface configured to engage the accessory, and a coupling portion configured to selectively at least partially receive one of a first structure member and a second structure member, the first and second structure members having different sizes;
 a jaw selectively adjustable between an open position and a closed position, the jaw including:
  a first member pivotally connected to the body by a first pivot selectively movable between a first position and a second position; and
  a second member pivotally connected to the first member by a second pivot;
 an actuator pivotally connected to the second member of the jaw by a third pivot, and pivotally connected to the body by a fourth pivot;
 in response to the first pivot being moved to the first position, the mounting clamp is in a first configuration adapted for clamping to the first structure member;
 in response to the first pivot being moved to the second position, the mounting clamp is in a second configuration adapted for clamping to the second structure member; and
 the jaw being configured to clamp one of the first structure member and the second structure member in response to being adjusted to the closed position.

2. The mounting clamp of claim 1, wherein in response to actuating the actuator, the second pivot pivots about to the first pivot, and the jaw moves between the opened and closed positions.

3. The mounting clamp of claim 1, wherein the second, third and fourth pivots are configured to provide an over-center effect when the jaw is in closed position.

4. The mounting clamp of claim 1, wherein:
 when the mounting clamp is in the first configuration and the jaw is in the closed position, the jaw is configured to clamp the first structure member with a first clamping force; and
 when the mounting clamp is in the second configuration, and the jaw is in the closed position, the jaw is configured to clamp the second structure member with a second clamping force,
 a magnitude of the first clamping force is generally similar to a magnitude of the second clamping force.

5. The mounting clamp of claim 1, wherein:
 when the mounting clamp is in the first configuration and the jaw is in the closed position, the jaw is configured to clamp the first structure member with a first clamping force; and
 when the mounting clamp is in the second configuration, and the jaw is in the closed position, the jaw is configured to clamp the second structure member with a second clamping force,
 an orientation of the first clamping force is generally similar to an orientation of the second clamping force.

6. The mounting clamp of claim 1, wherein when the first pivot is in one of the first and second positions, the first pivot is disposed on a border of a virtual circle, a virtual center of the virtual circle being generally aligned with the second pivot when the jaw is in the closed position.

7. The mounting clamp of claim 1, wherein the first member has an angled portion, and a virtual bisector line passing through the angled portion is generally parallel to a virtual line passing through the first and second pivots.

8. The mounting clamp of claim 1, wherein the body has a guide configured to at least partially receive the first pivot, and to guide the first pivot between the first and second positions.

9. The mounting clamp of claim 8, wherein the guide is a guiding slot.

10. The mounting clamp of claim 8, wherein the guide defines a first recess and a second recess spaced from the first recess, and the first pivot is in the first position when the first pivot is in the first recess, and the first pivot is in the second position when the first pivot is in the second recess.

11. The mounting clamp of claim 1, further including a retaining member selectively moveable between a third position and a fourth position, and wherein:
 the retaining member is configured to retain the first pivot in the first position when the retaining member is in the third position; and
 the retaining member is configured to retain the first pivot in the second position when the retaining member is in the fourth position.

12. The mounting clamp of claim 11, wherein the body defines a recess configured to at least partially receive the retaining member, the retaining member being moveable within the recess between the third and fourth positions.

13. The mounting clamp of claim 1, further including a resilient member operatively connected to the body and to the first pivot, the resilient member biasing the first pivot toward one of the first and second positions, and wherein:

in response to one of the first and second structure members being at least partially received into the coupling portion, the mounting clamp being biased to move to a corresponding one of the first and second configurations, and in response to the jaw being adjusted to the closed position, the jaw clamping the one of the first and second structure members.

14. The mounting clamp of claim 13, wherein the mounting clamp is a self-adjusting clamp.

15. The mounting clamp of claim 1, wherein the coupling portion defines:

a first arcuate section having a first arc radius complementary to a first arc radius of the first structure member; and a second arcuate section having a second arc radius complementary to a second arc radius of the second structure member.

16. The mounting clamp of claim 1, wherein the first pivot is selectively movable between the first position, the second position and a fifth position, and in response to the first pivot being moved to the fifth position, the mounting clamp is in a third configuration adapted for clamping to a third structure member defining a third arc having a third arc radius different from the first and second arc radii.

17. An accessory for a vehicle comprising at least one mounting clamp according to claim 1.

18. The accessory of claim 17, wherein the accessory and the at least one mounting clamp are unitary.

19. An accessory kit comprising:

an accessory for a vehicle, the accessory having a connecting portion; and at least one mounting clamp according to claim 1 engageable to the connecting portion for coupling the accessory to a structure of a vehicle.

\* \* \* \* \*